US011887464B2

(12) United States Patent
Doutre et al.

(10) Patent No.: US 11,887,464 B2
(45) Date of Patent: Jan. 30, 2024

(54) SECURITY ECOSYSTEM, DEVICE AND METHOD FOR DISTRIBUTING PHYSICAL RESOURCES BASED ON WORKFLOW INTERACTIONS

(71) Applicant: MOTOROLA SOLUTIONS, INC., Chicago, IL (US)

(72) Inventors: Barbara R. Doutre, Chicago, IL (US); Jonathan Whitall, Chicago, IL (US); Brandy Barber, Chicago, IL (US); Aurelie Y. Gaussorgues, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 237 days.

(21) Appl. No.: 17/559,887

(22) Filed: Dec. 22, 2021

(65) Prior Publication Data

US 2023/0196903 A1 Jun. 22, 2023

(51) Int. Cl.
*G08B 27/00* (2006.01)
*G08B 23/00* (2006.01)
(Continued)

(52) U.S. Cl.
CPC ........... *G08B 27/005* (2013.01); *G08B 23/00* (2013.01); *G08B 26/007* (2013.01); *G08B 29/20* (2013.01)

(58) Field of Classification Search
CPC ... G06F 16/156; G06F 40/186; G06Q 50/265; G06K 9/00483
(Continued)

(56) References Cited

U.S. PATENT DOCUMENTS 7,216,292 B1 * 5/2007 Snapper ................ G06F 40/174 715/236
8,788,247 B2 7/2014 Lee
(Continued)

OTHER PUBLICATIONS

Orchestrate User Guide, Motorola Solutions, Inc. (MN007834A01-B), Mar. 2021.
(Continued)

*Primary Examiner* — Maria El-Zoobi
(74) *Attorney, Agent, or Firm* — PERRY + CURRIER, INC.

(57) ABSTRACT

A security ecosystem, device and method for distributing physical resources based on workflow interactions is provided. A computing device determines that a trigger, of a safety-workflow, has occurred, comprising: determining, from distribution-tracking data, that distribution of physical resources in a region meets a suboptimal-distribution condition. In response, the computing device implement a first responsive action, of the safety-workflow, comprising generating an indication of the distribution of the physical resources in the region at an electronic map. The computing device implements an analysis component, of the safety-workflow, comprising: determining whether the distribution of the physical resources meeting the suboptimal-distribution condition meets a predetermined exemption condition. In response to the predetermined exemption condition not being met, the computing device implements a second responsive action, of the safety workflow, comprising: providing an alert to one or more notification devices identifying that the distribution of the physical resources meets the suboptimal-distribution condition.

20 Claims, 16 Drawing Sheets

(51) Int. Cl.
*G08B 29/20* (2006.01)
*G08B 26/00* (2006.01)

(58) Field of Classification Search
USPC ........................................................ 455/404.1
See application file for complete search history.

(56) References Cited

U.S. PATENT DOCUMENTS

| | | | | |
|---|---|---|---|---|
| 10,380,876 | B2 * | 8/2019 | Miasnik | G08B 27/006 |
| 10,861,320 | B2 | 12/2020 | Martin et al. | |
| 2015/0286625 | A1 * | 10/2015 | Escarguel | G06F 16/156 715/220 |
| 2020/0213241 | A1 * | 7/2020 | Dhanabalan | H04L 47/28 |
| 2020/0250230 | A1 * | 8/2020 | Abhyankar | G06F 16/9535 |
| 2021/0073026 | A1 * | 3/2021 | Myers | G06F 11/3065 |
| 2021/0263889 | A1 | 8/2021 | Paras Ram et al. | |

OTHER PUBLICATIONS

Orchestrate System Planner, Motorola Solutions, Inc. (MN007836A01-B), Mar. 2021.

* cited by examiner

SECURITY ECOSYSTEM, DEVICE AND METHOD FOR DISTRIBUTING PHYSICAL RESOURCES BASED ON WORKFLOW INTERACTIONS

BACKGROUND OF THE INVENTION

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system may have to be configured to provide the notifications to the radios and the video security system may have to be configured to provide the notifications to the radios. Thus, both the access control system and the video security system may need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem may be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool equips administrators with the capabilities they need to detect triggers across a number of installed devices/systems and quickly take actions (execute workflows) to reduce the risk of breaches and downtime by automatically alerting the appropriate teams and executing the proper procedures.

Such automated workflows may also be useful to manage and monitor distribution of physical resources during public safety incidents.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
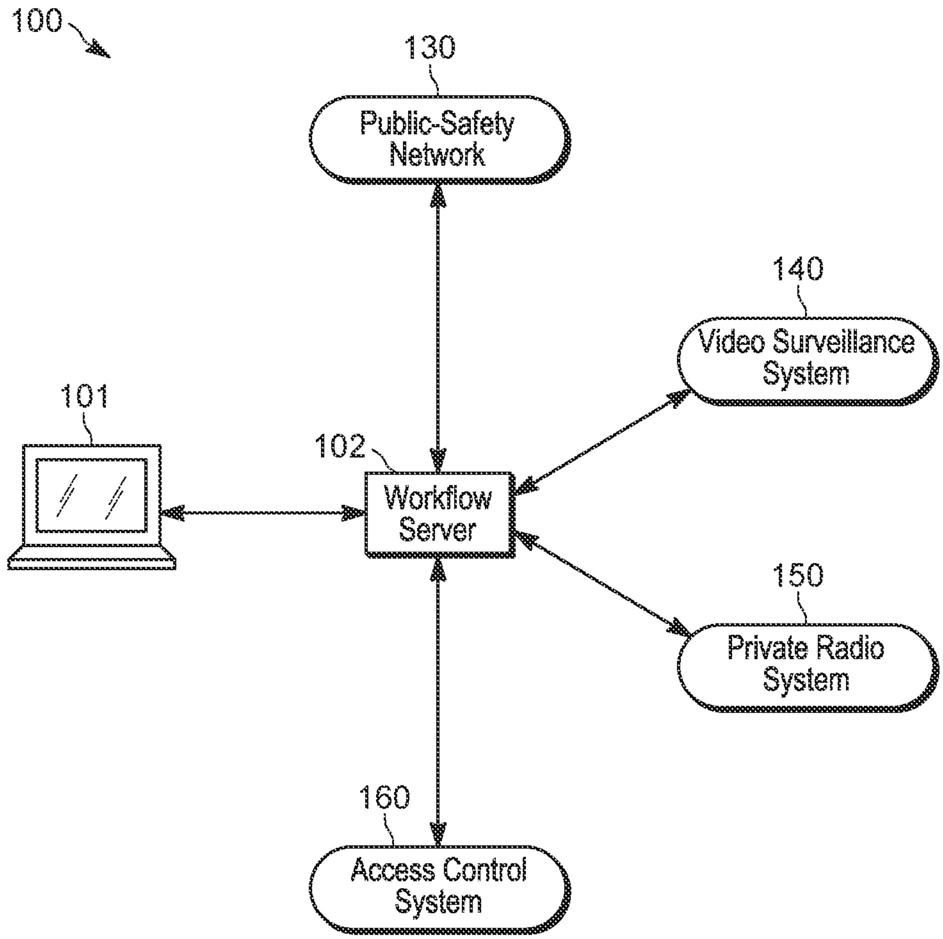
FIG. 1 depicts a security ecosystem capable of configuring and automating workflows, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned need, a system, method, and apparatus for implementing workflows across multiple differing systems and devices is provided herein. During operation, a computing device, such as a workflow server, may monitor one or more triggers that occur in the differing systems and devices based on sensor data generated by, and received from one or more sensors, and, in response, implement one or more actions that may include communicating with one or more communication devices across the differing systems and devices, for example to dispatch security personnel associated with the one or more communication devices to locations at which the sensor data was collected that lead to the triggers. However, it may be challenging to communicate to the one or more communication devices the sensor data that lead to the one or more triggers and/or to change and/or control the safety workflows. Thus, there exists a need for an improved technical system, device, and system for distributing physical resources based on workflow interactions.

Hence, provided herein is a computing device, for example in the form a workflow server interacting with a workstation, which monitors execution of a safety workflow and/or a plurality of safety workflows. A safety workflow is understood to include an association between a trigger, which occurs when certain conditions are met as determined using sensor data from a physical sensor, and an action, which occurs in response to the trigger and which may include at least an electronic interaction and/or communication with a communication device. One example trigger may comprise determining that a given door is open (e.g., and/or has been open for a given time period) and a responsive action may comprise communicating with a given communication device to dispatch security personnel operating the communication device to the location of the open door.

The computing device further provides, at a display screen (e.g., of the workstation), an indication of a safety work flow and respective visual indications of a physical sensor that generated sensor data of a trigger of the safety workflow and a communication device associated with a responsive action to the trigger. An input device may be used to detect an interaction with one or more of the respective visual indications to one or more of retrieve the sensor data, communicate with the communication device, and send the sensor data to the communication device.

An aspect of the present specification provides a method comprising: monitoring, at a computing device, execution of a safety workflow, the safety workflow comprising a trigger, an analysis component, and one or more responsive actions; determining, at the computing device, that the trigger has occurred, the trigger comprising: determining, based on distribution tracking data, that distribution of physical resources in a given region meets a suboptimal-distribution condition; in response to the trigger occurring, implementing, at the computing device, a first responsive action comprising generating an indication of the distribution of the physical resources in the given region at an electronic map; implementing the analysis component comprising: determining, at the computing device, whether the distribution of the physical resources meeting the suboptimal-distribution condition meets a predetermined exemption condition; and in response to the analysis component determining that the predetermined exemption condition has not been met, implementing a second responsive action comprising: providing, via the computing device, an alert to one or more notification devices identifying that the distribution of the physical resources meets the suboptimal-distribution condition.

Another aspect of the present specification provides a computing device comprising: a network interface; and a processor configured to: monitor execution of a safety workflow, the safety workflow comprising a trigger, an analysis component, and one or more responsive actions; determine that the trigger has occurred, the trigger comprising: determining, based on distribution tracking data, that distribution of physical resources in a given region meets a suboptimal-distribution condition; in response to the trigger occurring, implement a first responsive action comprising generating an indication of the distribution of the physical resources in the given region at an electronic map; implement the analysis component comprising: determining whether the distribution of the physical resources meeting the suboptimal-distribution condition meets a predetermined exemption condition; and in response to the analysis component determining that the predetermined exemption condition has not been met, implement a second responsive action comprising: providing an alert, via the network interface, to one or more notification devices identifying that the distribution of the physical resources meets the suboptimal-distribution condition.

Each of the above-mentioned aspects will be discussed in more detail below, starting with example system and device architectures of the system in which the embodiments may be practiced, followed by an illustration of processing blocks for achieving an improved security ecosystem, device and method for distributing physical resources based on workflow interactions.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Turning now to the drawings, wherein like numerals designate like components, FIG. 1 illustrates a security ecosystem 100 capable of configuring and automating workflows across multiple systems. The security ecosystem 100 is interchangeably referred to hereafter as the system 100. Furthermore, workflows as referred to herein may alternatively be referred as security workflows as workflows as referred to herein may be used to implement security-based action and/or security base processes.

The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

As shown, the security ecosystem 100 comprises a public-safety network 130, a video surveillance system 140, a private radio system 150, and an access control system 160. A workflow server 102 is coupled to each of the network 130 and the systems 140, 150, and 160. The workstation 101 is shown coupled to the workflow server 102, and is utilized to configure the workflow server 102 with workflows, for example as generated by a user. It should be noted that although the components in FIG. 1 are shown geographically separated, these components can exist within a same geographic area, such as, but not limited to a school, a hospital, an airport, a sporting event, a stadium, a factory, a warehouse and/or any other suitable location and/or building and the like. It should also be noted that although only the network 130 and the systems 140, 150, and 160 are shown in FIG. 1, many more networks and/or systems may be included in the security ecosystem 100 and/or any suitable number of networks and/or systems may be included in the security ecosystem 100.

The workstation 101 may comprise a computer configured to execute Motorola Solution™'s Orchestrate™ and Ally™ dispatch and incident management software. As will be discussed in more detail below, the workstation 101 is configured to present a user with a plurality of triggers capable of being detected by the network 130 and the systems 140, 150, and 160 as well as present the user with a plurality of actions capable of being executed by the network 130 and the systems 140, 150, and 160. The user will be able to generate workflows and upload these workflows to the workflow server 102 based on the presented triggers and actions. While only one workstation 101, the system 100 may comprise a plurality of workstations 101.

The workflow server 102 may comprise a server running Motorola Solution™'s Command Central™ software suite comprising the Orchestrate™ platform. While the workflow server 102 is depicted as one device, the workflow server 102 may be implemented as one or more computing devices, one or more servers, one or more cloud computing devices, and the like, and/or the functionality of the workflow server 102 may be geographically distributed.

The workflow server 102 is configured to receive workflows generated by the workstation 101 (and/or a plurality of workstations 101) and implement the workflows. Furthermore, the workflow server 102 may implement (e.g., concurrently, and the like) different workflows associated with different workstations. Particularly, the workflows are implemented by analyzing events detected by the network 130 and the systems 140, 150, and 160 and executing appropriate triggers. In a particular example, a user may generate a workflow on the workstation 101 that has a trigger comprising the video surveillance system 140 detecting a loitering event, and has an action comprising notifying radios within the public-safety network 130. When this workflow is uploaded to the workflow server 102, the workflow server 102 will notify the radios of any loitering event detected by the video surveillance system 140.

The public-safety network 130 is configured to detect various triggers and report the detected triggers to the workflow server 102. The public-safety network 130 is also configured to receive action commands from the workflow server 102 and execute the actions. In some examples, the public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from the workflow server 102.

The video surveillance system 140 is configured to detect various triggers and report the detected triggers to the workflow server 102. The video surveillance system 140 is also configured to receive action commands from the workflow server 102 and execute the actions. In one example, the video surveillance system 140 comprises a plurality of video cameras that may be configured to automatically change their field-of-views over time. The video surveillance system 140 is configured with a recognition engine/video analysis engine (VAE) that comprises a software engine that analyzes any video captured by the cameras using, for example, any suitable process which may include, but is not limited to machine learning algorithms, convolutional neural networks (CNNs), and the like. Using the VAE, the video surveillance system 140 is capable of "watching" video to detect any triggers and report the detected triggers to the workflow server 102. These triggers may include, but are not limited to, appearance searches and unusual Activity Detection (e.g., loitering). In a similar manner, the video surveillance system 140 is configured to execute action commands received from the workflow server 102. In some examples, the video surveillance system 140 comprises an Avigilon™ Control Center (ACC) server having Motorola Solution™'s Access Control Management (ACM)™ software suite.

The private radio system 150 may comprise a private enterprise radio system that is configured to detect various triggers and report the detected triggers to the workflow server 102. The private radio system 150 is also configured to receive action commands from the workflow server 102 and execute the actions. In some examples, the private radio system 150 comprises a MOTOTRBO™ communication system having radio devices that operate in the Citizens Broadband Radio Service (CBRS) spectrum and combines broadband data with voice communications.

The access control system 160 comprises an Internet-of-Things (IoT) network which may serve to connect every-day devices to the Internet. Devices such as cars, kitchen appliances, medical devices, sensors, doors, windows, HVAC (heating, ventilation, and air conditioning) systems, drones, . . . , etc. can all be connected through the IoT network of the access control system 160. Indeed, any suitable device that can be powered may be connected to the internet to control its functionality. The access control system 160 generally allows objects to be sensed or controlled remotely across existing network infrastructure. For example, the access control system 160 may be configured to provide access control to various doors and windows. In particular, the access control system 160 is configured to detect various triggers (e.g., door opened/closed) and report the detected triggers to the workflow server 102. The access control system 160 is also configured to receive action commands from the workflow server 102 and execute the action received from the workflow server 102. The action commands may take the form of instructions to lock, open, and/or close a door or window.

As is evident, the security ecosystem 100 allows an administrator using the workstation 101 to generate rule-based, automated workflows between technologies to enhance efficiency, and improve response times, effectiveness, and overall safety. The security ecosystem 100 generally has the capability to detect triggers across a number of devices within the network 130 and the systems 140, 150, and 160 and quickly take actions by automatically executing the proper procedure (i.e., executing the appropriate action once a trigger is detected).

The network 130 and the systems 140, 150, and 160 are next described in further detail.

Figure 2:
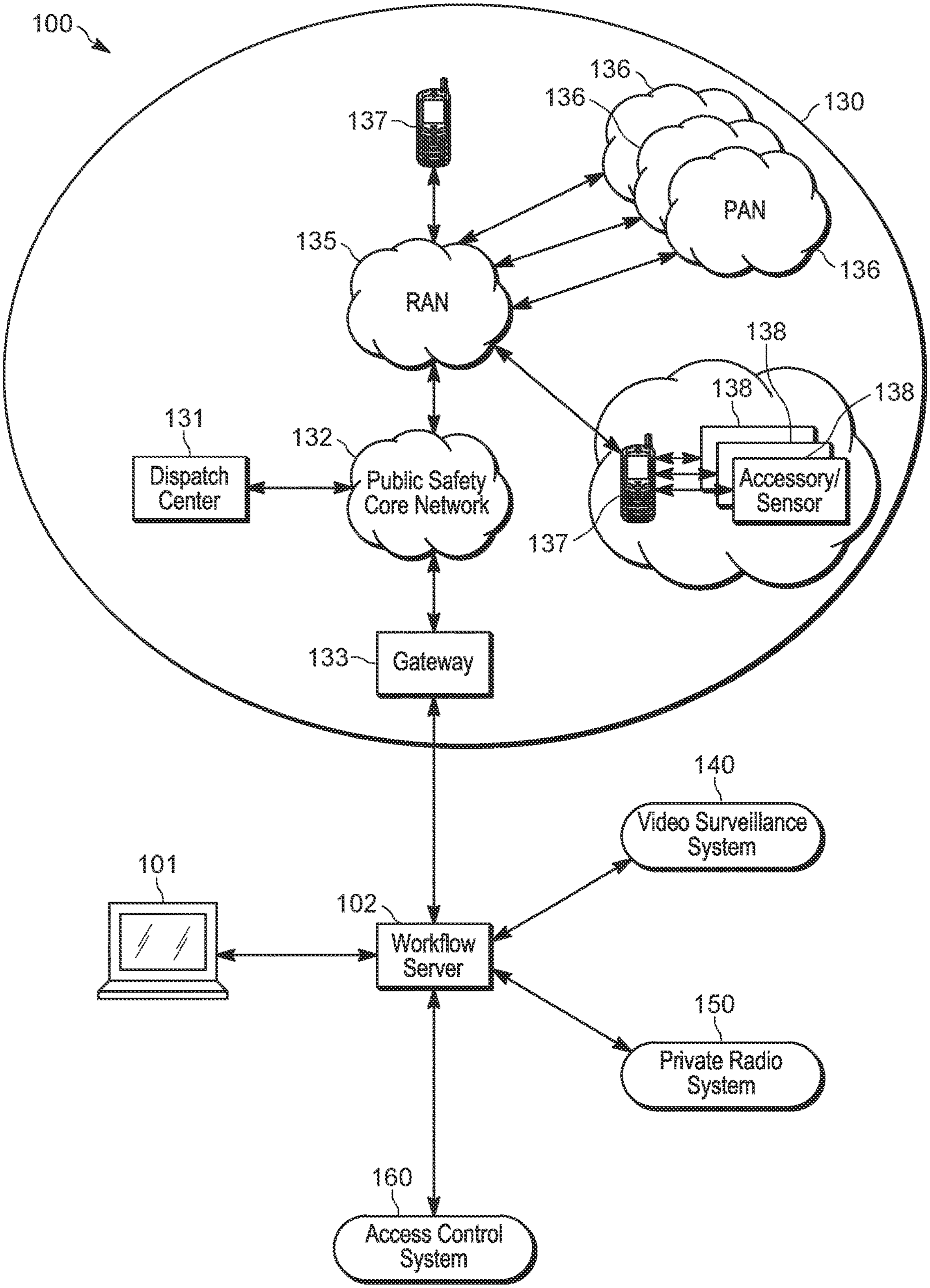
FIG. 2 depicts a security ecosystem capable of configuring and automating workflows, in accordance with some examples.

FIG. 2 illustrates a security ecosystem capable of configuring and automating workflows. In particular, FIG. 2 shows the security ecosystem 100 with an expanded view of the public-safety network 130. As shown, the public-safety network 130 comprises a dispatch center 131, a public-safety core network 132, a gateway 133, a radio access network (RAN) 135, a plurality of personal-area networks (PANs) 136, and at least one radio 137, such as a public-safety radio and the like (however the radios 137 may include, but are not limited to, any suitable combination of communication devices, such as mobile phones, two-way radios, and the like). As shown, each PAN 136 comprises a radio 137 acting as a hub to smart devices/accessories/sensor 138 (interchangeably referred to hereafter as the sensors and/or a sensor 138).

The gateway 133 may comprise an Avigilon™ Control Center running Avigilon's Access Control Management software. The gateway 133 is configured to run any suitable Application Program Interface (API) to provide communications between the public-safety core network 132 and the workflow server 102.

A public safety officer (not shown in FIG. 2) may be equipped with sensors 138 that determine various physical and environmental conditions surrounding the public-safety officer. These conditions may be reported back to, for example, the dispatch center 131 or the workflow server 102 so an appropriate action may be taken. For example, police officers may have a sensor 138 (e.g., in the form of a gun-draw sensor) that determines when a gun is drawn. Upon detecting that an officer has drawn their gun, a notification may be sent back to the dispatch operator and/or the workflow server 102 so that, for example, other officers in the area may be notified of the situation.

It is envisioned that the public-safety officer may have an array of these sensors 138 available to the officer at the beginning of a shift. The officer may select and pull sensors 138 off a shelf, and form a personal-area network (PAN) 136 with the devices that may accompany the officer on their shift. For example, the officer may pull a gun-draw sensor, a body-worn camera, a wireless microphone, a smart watch, a police radio, smart handcuffs, a man-down sensor, a bio-sensor, and the like. All sensors 138 pulled by the officer may be configured to form a PAN 136 by associating (pairing) with each other and communicating wirelessly among the devices. At least one device may be configured with a digital assistant. In some examples, a PAN 136 comprises more than two sensors 138, so that many sensors 138 may be connected via a PAN 136 simultaneously.

A method called bonding may be used for recognizing specific sensors 138 and thus enabling control over which accessories are allowed to connect to each other when forming a PAN 136. Once bonded, accessories then can establish a connection without user intervention. A bond may be generated through a process called "pairing". The pairing process may be triggered by a specific request by the user to generate a bond from a user via a user interface on the accessories. Thus, as shown, public-safety network 130 incorporates PANs 136 generated as described above. In some examples, radios 137 and sensors 138 form a PAN 136, with communication links between sensors 138 and radios 137 taking place utilizing a short-range communication system protocol such as a Bluetooth communication system protocol. In this particular example, a PAN 136 may be associated with a single officer. Thus, FIG. 2 illustrates multiple PANs 136 associated with multiple officers (not shown).

The RAN 135 may include various RAN elements such as base stations, base station controllers (BSCs), routers, switches, and the like, arranged, connected, and programmed to provide wireless service to user equipment (e.g., the radios 137, and the like) in a manner known to those of skill in the relevant art. The RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other examples, the RAN 135 may implement a Long Term Evolution (LTE), LTE-Advance, or 5G protocol including multimedia broadcast multicast services (MBMS) or single site point-to-multipoint (SC-PTM) (including, but not limited to open mobile alliance (OMA) push to talk (PTT) over cellular (OMA-PoC)), a voice over IP (VoIP), an LTE Direct or LTE Device to Device, or a PTT over IP (PoIP) application may be implemented. In still further examples, the RAN 135 may implement a Wi-Fi protocol for example operating in accordance with an IEEE 802.11 standard (e.g., 802.11a, 802.11b, 802.11g) or a WiMAX protocol for example operating in accordance with an IEEE 802.16 standard.

The public-safety core network 132 may include one or more packet-switched networks and/or one or more circuit-switched networks, and in general provides one or more public-safety agencies with any suitable computing and communication needs, transmitting any suitable public-safety-related data and communications.

For narrowband LMR wireless systems, the public-safety core network 132 may operate in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some examples, group IDs (identifiers) may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (such as at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) c based on user input, and the switching and/or radio network may track group membership and route new group calls according to the current group membership.

The radios 137 generally serve as PAN main devices, and may be any suitable computing and communication device configured to engage in wireless communication with the RAN 135 over the air interface as is known to those in the relevant art. Moreover, one or more radios 137 are further configured to engage in wired and/or wireless communication with one or more local sensor 138 via a local communication link. The radios 137 may be configured to determine when to forward information received from PA sensors 138 to, for example, a dispatch center or the workflow server 102.

Some examples of sensors 138 follow:

In some examples, a sensor 138 may comprise a sensor-enabled holster that maintains and/or provides state information regarding a weapon or other item normally disposed within the user's sensor-enabled holster. The sensor-enabled holster may detect a change in state (presence to absence) and/or an action (removal) relative to the weapon normally disposed within the sensor-enabled holster. The detected change in state and/or action may be reported to a radio 137 via its short-range transceiver, which may forward the state change to the dispatch center 131 or the workflow server 102. In some examples, the sensor-enabled holster may also detect whether the first responder's hand is resting on the weapon even if it has not yet been removed from the holster and provide such information to portable radio 137.

In some examples, a sensor 138 may comprise a biometric sensor (e.g., a biometric wristband) for tracking an activity of the user or a health status of a user, and may include one or more movement sensors (such as an accelerometer, magnetometer, and/or gyroscope) that may periodically or intermittently provide to a radio 137 indications of orientation, direction, steps, acceleration, and/or speed, and indications of health such as one or more of a captured heart rate, a captured breathing rate, and a captured body temperature of the user, for example accompanying other information. This information may be reported to a radio 137 which may forward the information to the dispatch center 131 and/or the workflow server 102.

In some examples, a sensor 138 may comprise an accelerometer to measure acceleration. Single and multi-axis models are available to detect magnitude and direction of the acceleration as a vector quantity, and may be used to sense orientation, acceleration, vibration shock, and falling. The accelerometer may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to a radio 137 which may forward the information to dispatch center 131 and/or the workflow server 102.

In some examples, a sensor 138 may comprise a heart rate sensor that uses electrical contacts with the skin to monitor an electrocardiography (EKG) signal of its wearer, or may use infrared light and imaging device to optically detect a pulse rate of its wearer, among other possibilities. This information may be reported to a radio 137 which may forward the information to the dispatch center 131 and/or the workflow server 102.

In some examples, a sensor 138 may comprise a breathing rate sensor 138 to monitor breathing rate. The breathing rate sensor may include use of a differential capacitive circuits or capacitive transducers to measure chest displacement and thus breathing rates. In other examples, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to a radio 137 which may forward the information to the dispatch center 131 and/or the workflow server 102.

The dispatch center 131 may comprise, and/or may be part of, a computer-aided-dispatch center (sometimes referred to as an emergency-call center or public-safety answering point), that may be manned by an operator providing any suitable dispatch operations. For example, the dispatch center 131 may comprise a graphical user interface that provides the dispatch operator any suitable information about public-safety officers. As discussed above, some of this information originates from sensors 138 providing information to radios 137, which forwards the information to the RAN 135 and ultimately to the dispatch center 131.

In a similar manner, information about public-safety officers may be provided to the workflow server 102. This information may originate from the sensors 138 providing information to the radios 137, which forwards the information to the RAN 135 and ultimately to the workflow server 102 via the public-safety core network 132 and the gateway 133. For example, a sensor 138 comprising a gun-draw sensor may send an indication to the workflow server 102 that a gun has been drawn. This may serve as a "trigger" for the workflow server 102 to initiate a particular "action", for example, notifying surrounding officers (for example on a particular talkgroup) by having their radios 137 provide an alarm indicating the triggering event. Thus, the workflow server 102 may provide instructions to any sensor 138 or radio 137 by sending an "action" to a sensor 138 in response to a trigger being received.

Figure 3:
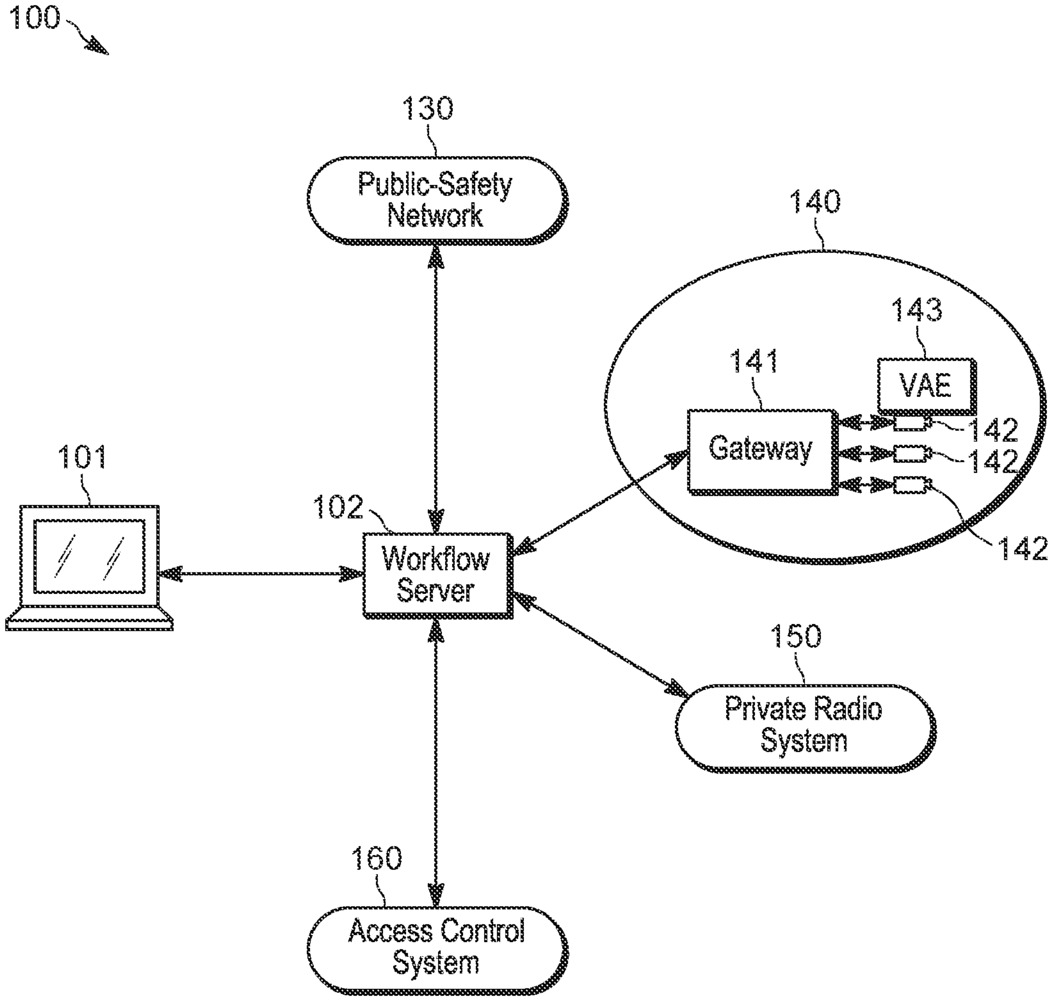
FIG. 3 depicts a security ecosystem capable of configuring and automating workflows, in accordance with some examples.

FIG. 3 illustrates a security ecosystem capable of configuring and automating workflows. In particular, FIG. 3 shows the security ecosystem 100 with an expanded view of the video surveillance system 140. As shown, the video surveillance system 140 comprises a plurality of image sensors and/or cameras 142 and the gateway 141.

Cameras 142 may be fixed or mobile, and may have pan/tilt/zoom (PTZ) capabilities to change their field-of-view. The cameras 142 are generally understood to comprise image sensors and hence may also be referred to as images sensors. Cameras 142 may also comprise circuitry configured to serve as a VAE 143 (only one of which is depicted in FIG. 3, though it is understood that any camera 142 may comprise circuitry configured to serve as a VAE 143). The VAE 143 comprises a software engine that analyzes analog and/or digital video. The VAE 143 is generally configured to "watch" video and detect pre-selected objects such as license plates, people, faces, automobiles. The VAE 143 may also be configured to detect certain actions of individuals, such as fighting, loitering, crimes being committed, . . . , etc. and/or actions of objects, such as speeding, a car driving on a pedestrian walkway, a car moving against the flow of traffic, . . . , etc.; however the VAE 143 may be configured to detect any suitable action. The VAE 143 may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires. Combinations of object detectors may be utilized to detect combinations of objects, such as automobiles on fire, and the like, automobiles that are not on fire, and the like.

The gateway 141 may comprise an Avigilon™ Control Center running Avigilon's Access Control Management software. The gateway 141 is configured to run any suitable Application Program Interface (API) to provide communications between any cameras 142 and the workflow server 102.

Figure 4:
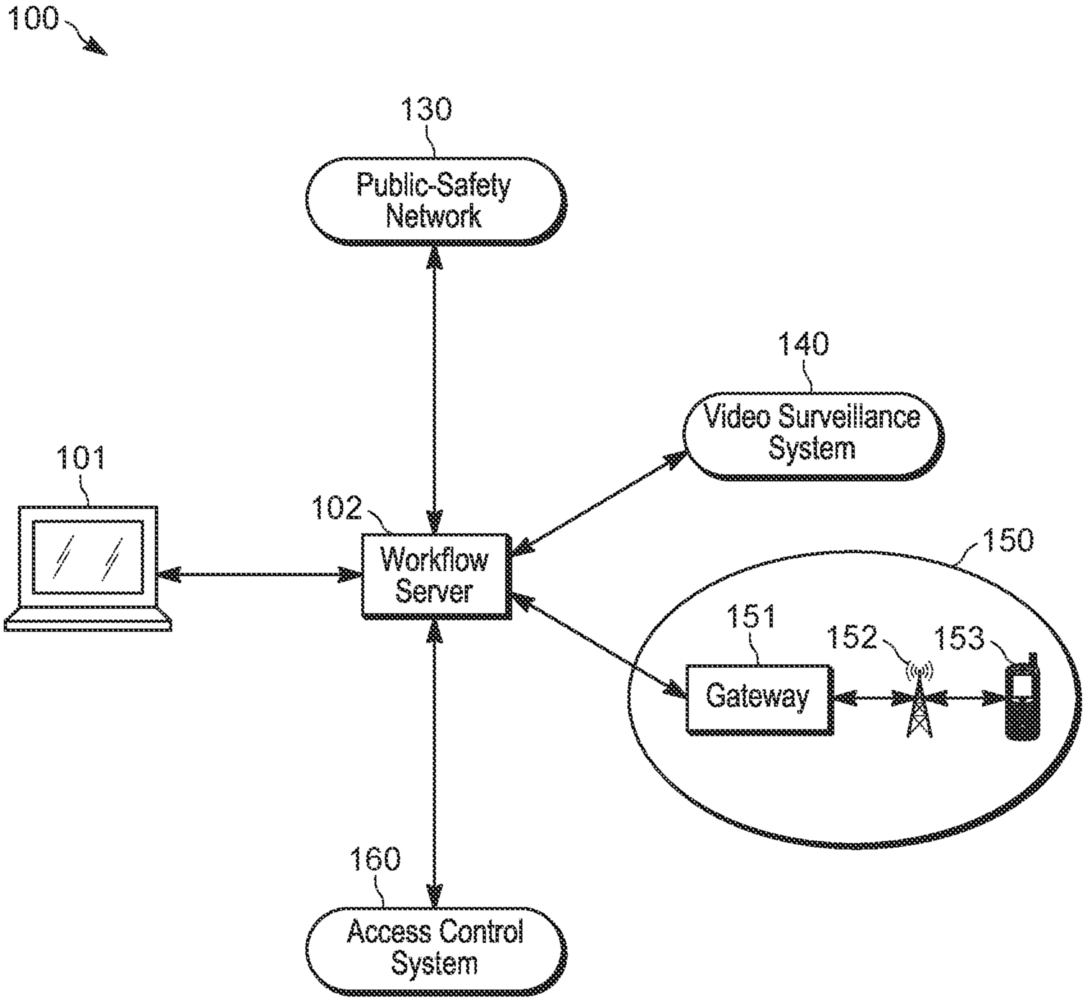
FIG. 4 depicts a security ecosystem capable of configuring and automating workflows, in accordance with some examples.

FIG. 4 illustrates a security ecosystem capable of configuring and automating workflows. In particular, FIG. 4 shows the security ecosystem 100 with an expanded view of the private radio system 150. As shown, the private radio system 150 comprises the gateway 151, system infrastructure 152, and at least one radio 153. Communications from the radio 153 to the workflow server 102 passes through the system infrastructure 152, the gateway 151, and ultimately to the workflow server 102.

The gateway 151 may comprise an Avigilon™ Control Center running Avigilon's Access Control Management software. The gateway 151 is configured to run any suitable Application Program Interface (API) to provide communications between any of the system infrastructure 152 and the workflow server 102.

The system infrastructure 152 comprises any suitable equipment to provide wireless communications to and from the radio 153. The system infrastructure 152 may comprise Motorola Solution™'s MOTOTRBO™ equipment, such as an SLR Series Repeater (e.g., SLR 1000, SLR 5000, or SLR8000 repeater) configured to provide two-way radio service to radio 153.

Although only a single radio 153 is shown in FIG. 4, any suitable number of radios 153 may be present within the private radio system 150. Each radio 153 may comprise a MOTOTRBO™ two-way radio (such as a Motorola Solution™ XPR 5000 Series radio) with digital technology providing integrated voice and data communication.

Figure 5:
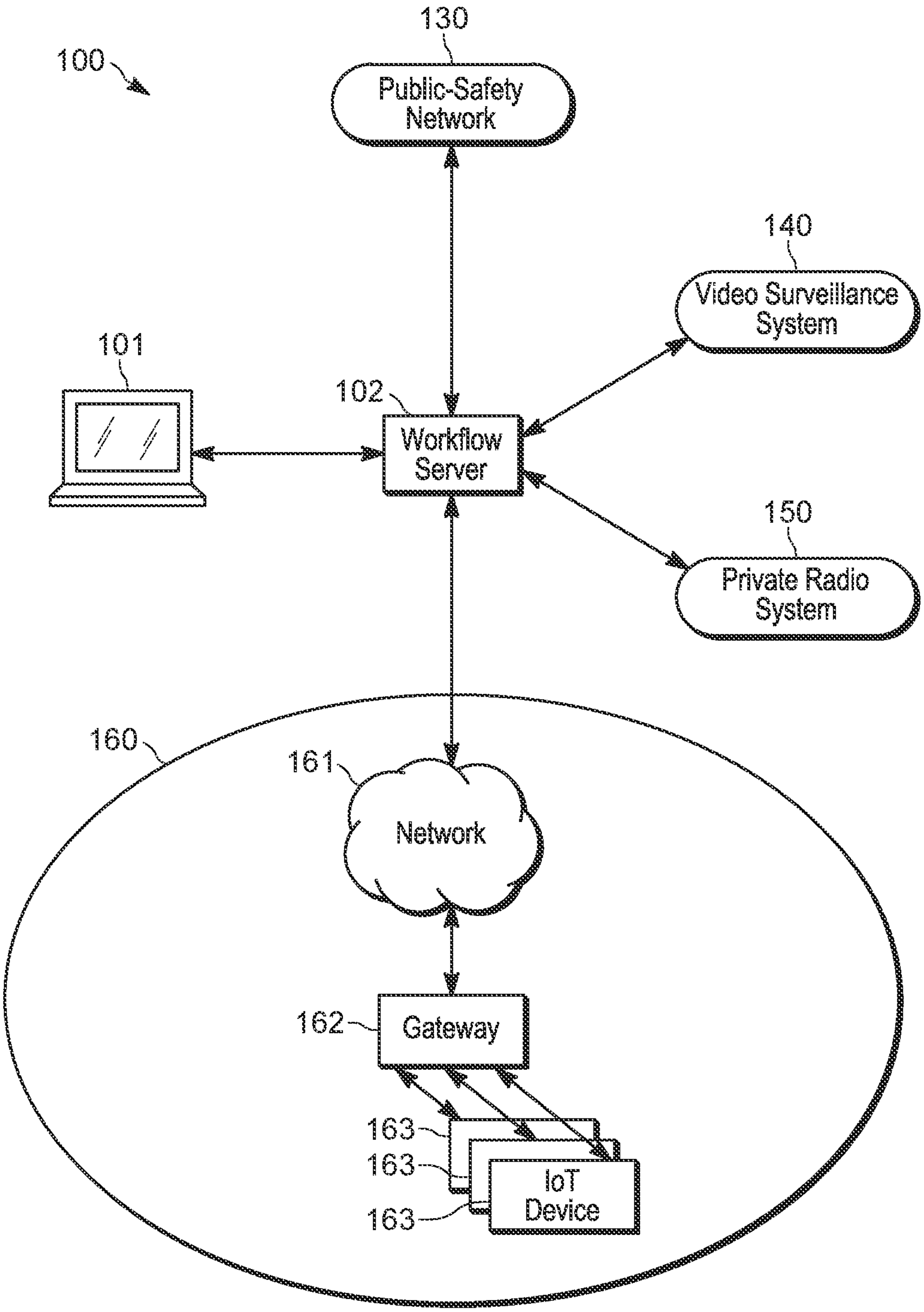
FIG. 5 depicts a security ecosystem capable of configuring and automating workflows, in accordance with some examples.

FIG. 5 illustrates a security ecosystem capable of configuring and automating workflows. In particular, FIG. 5 shows the security ecosystem 100 with an expanded view of the access control system 160. As shown, the access control system 160 comprises a gateway 162 and a plurality of IoT devices 163 coupled to the gateway 162. Data passed from the workflow server 102 to the IoT devices 163 passes through the network 161, the gateway 162 and ultimately to the IoT device 163. Conversely, data passed from the IoT devices 163 to the workflow server 102 passes through the gateway 162, the network 161, and ultimately to the workflow server 102.

The IoT devices 163 may comprise devices that control objects, doors, windows, sensors, and the like. Any particular suitable communication protocol (e.g., an IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

The gateway 162 may comprise an Avigilon™ Control Center running Avigilon's Access Control Management software. The gateway 162 is configured to run any suitable Application Program Interface (API) to provide communications between any IoT device 163 and the workflow server 102.

The network 161 may comprise one of many networks used to transmit data, including, but not limited to, a network employing one of the following protocols: conventional, or trunked LMR standard or protocol such as ETSIDMR, a 25 standard defined by the APCO, TETRA, or other LMR radio protocols or standards; LTE protocol, LTE-Advance protocol, or 5G protocol including multimedia broadcast MBMS or SC-PTM protocol (including, but not limited to an OMA-PTT OMA-PoC), a VoIP protocol, an LTE Direct or LTE Device to Device protocol, or a PoIP protocol, a Wi-Fi protocol for example operating in accordance with an IEEE 802.11 standard (e.g., 802.11a, 802.11b, 802.11g) or a WiMAX protocol for example operating in accordance with an IEEE 802.16 standard.

Figure 6:
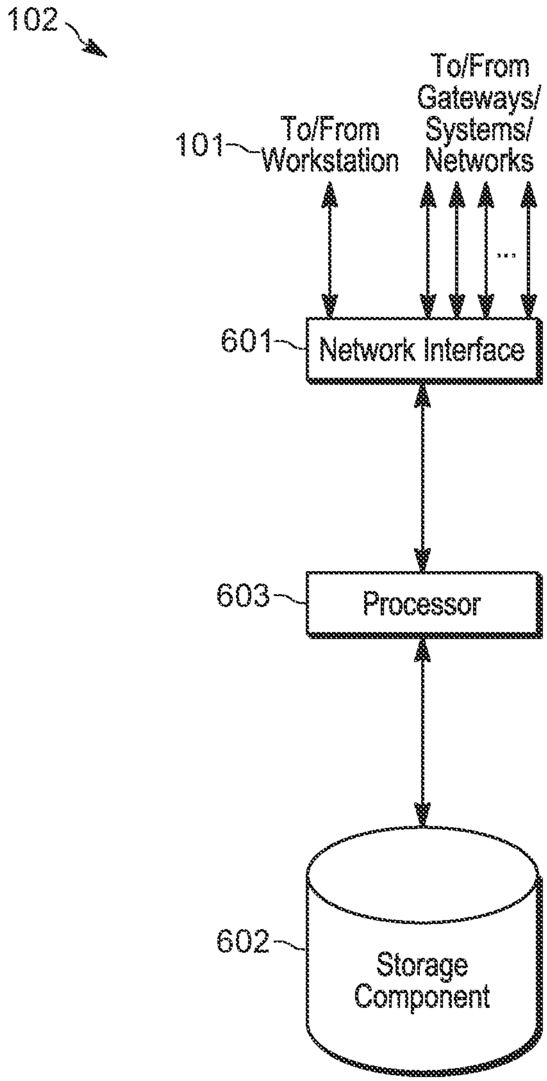
FIG. 6 is a block diagram of a workflow server of FIG. 1, in accordance with some examples.

FIG. 6 is a block diagram of the workflow server 102 of FIG. 1. As shown, the workflow server 102 comprises a network interface 601, a storage component 602 (e.g., as depicted a database, but may comprise any suitable memory and/or storage component), and a processor 603. The processor 603 is understood to include any suitable logic circuitry.

The network interface 601 includes any suitable components for communicating with other suitable components of the system 100, in particular, as depicted, to the workstation 101, the gateways 133, 141, 151, 162 of the network 130 and the systems 140, 150, and 160, and the like. Components of the network interface 601 include any suitable processing, modulating, and transceiver components that are operable in accordance with any one or more standard or proprietary wireless interfaces, wherein some of the functionality of the processing, modulating, and transceiver components may be performed by means of the processor 603 through programmed logic such as software applications or firmware stored on the storage component 602 (e.g., standard random access memory) or through hardware. The network interface 601 may include any suitable wired or wireless network interfaces, including, but not limited to, Ethernet interfaces, T1 interfaces, USB interfaces, IEEE 802.11b interfaces, IEEE 802.11g interfaces, and the like.

The processor 603 may comprise a digital signal processor (DSP), general purpose microprocessor, a programmable logic device, or application specific integrated circuit (ASIC), and the like, and is generally configured to receive triggers from various gateways, systems, and networks (e.g., of the system 100). The processor 603 is further configured to execute (or cause to be executed) a particular action for a trigger that is received. More particularly, when the processor 603 receives a trigger from any network or system, the processor 603 may access the storage component 602 to determine an action for the particular trigger. Once an action has been determined, the processor 603 will execute the action, or cause the action to be executed. In order to perform the above, the processor 603 may execute an instruction set/software (e.g., Motorola Solution™'s Command Central™ software suite comprising the Orchestrate™ platform) which may be stored at the storage component 602.

The storage component 602 may comprise standard memory (such as Random Access Memory (RAM), Read Only Memory (ROM), and the like) and generally serves to store associations between triggers and actions. Examples of various triggers and actions are illustrated in in Table 1, below.

TABLE 1

Associations Between Triggers and Actions.

| Trigger | Action |
|---|---|
| Warehouse back door opened | Pan camera "342" to point at door |
| Man-Down sensor activated for Officer Smith | Notify dispatch center via emergency text message |
| ALPR for delivery truck | Open back gate |
| . . . etc. | . . . etc. |

Figure 7:
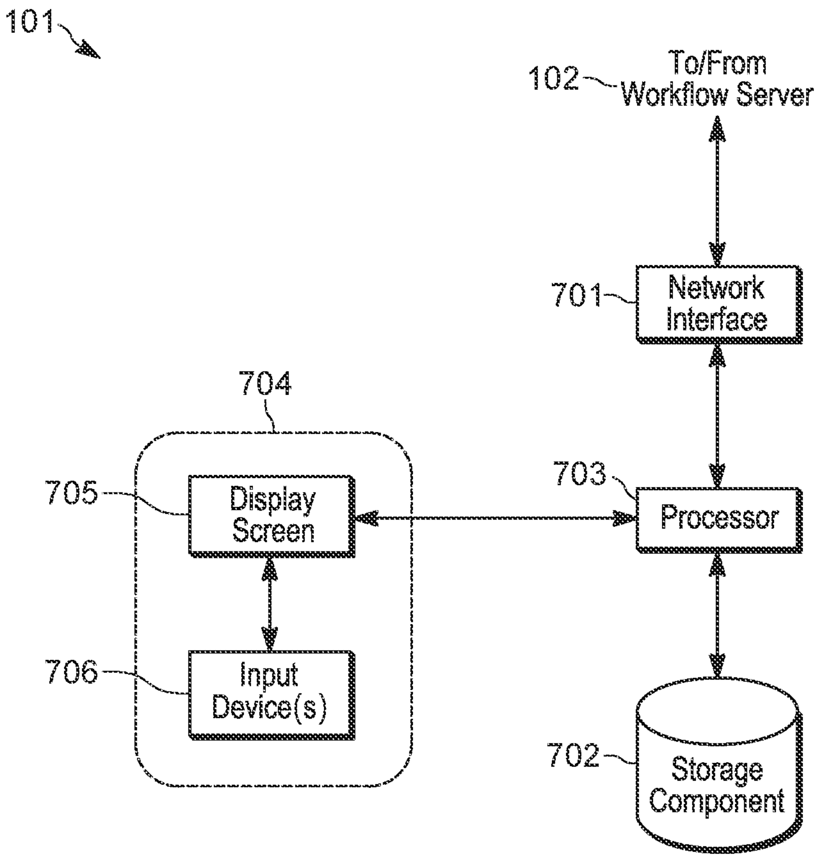
FIG. 7 is a block diagram of a workstation of FIG. 1 utilized to generate a workflow, in accordance with some examples.

FIG. 7 is a block diagram of the workstation 101 of FIG. 1 utilized to generate a workflow. As shown, the workstation 101 comprises a network interface 701, a storage component 702, a processor 703, and a graphical user interface (GUI) 704.

The network interface 701 includes any suitable components for communicating with other suitable components of the system 100, in particular, as depicted, to the workflow server 102. Components of the network interface 701 include any suitable processing, modulating, and transceiver components that are operable in accordance with any one or more standard or proprietary wireless interfaces, wherein some of the functionality of the processing, modulating, and transceiver components may be performed by means of the processor 703 through programmed logic such as software applications or firmware stored on the storage component 702 (e.g., standard random access memory) or through hardware. The network interface 701 may include any suitable wired or wireless network interfaces, including, but not limited to, Ethernet interfaces, T1 interfaces, USB interfaces, IEEE 802.11b interfaces, IEEE 802.11g interfaces, and the like.

Processor 703 may comprise a DSP), general purpose microprocessor, a programmable logic device, or an ASIC and may be configured to execute Motorola Solution™'s Orchestrate™ and Ally™ dispatch and incident management software which may be stored at the storage component 702. The execution of such software may allow users of the GUI 704 to generate workflows (i.e., actions and their associated responses) by receiving user inputs at the GUI 704 that define various triggers and their associated actions, which will ultimately be uploaded to the workflow server 102 and stored in the storage component 602.

The storage component 702 may comprise standard memory (such as RAM, ROM, and the like) and serves to store instructions as software. Particularly, Motorola Solution™'s Orchestrate™ and Ally™ dispatch and incident management software is may be stored at the storage component 702.

The GUI 704 generally provides a man/machine interface for receiving an input from a user and displaying information. For example, the GUI 704 may provide a mechanism of conveying (e.g., displaying) user-generated workflows. Thus, the GUI 704 may also provide a mechanism for a user to input workflows into a displayed form. In order to provide the above features (and additional features), the GUI 704 may include any combination of a display screen 705 (e.g., a computer screen, which may include a touch screen, a monitor, and the like) and any suitable combination of one or more input devices 706 (e.g., a keyboard and mouse combination).

Figure 8:
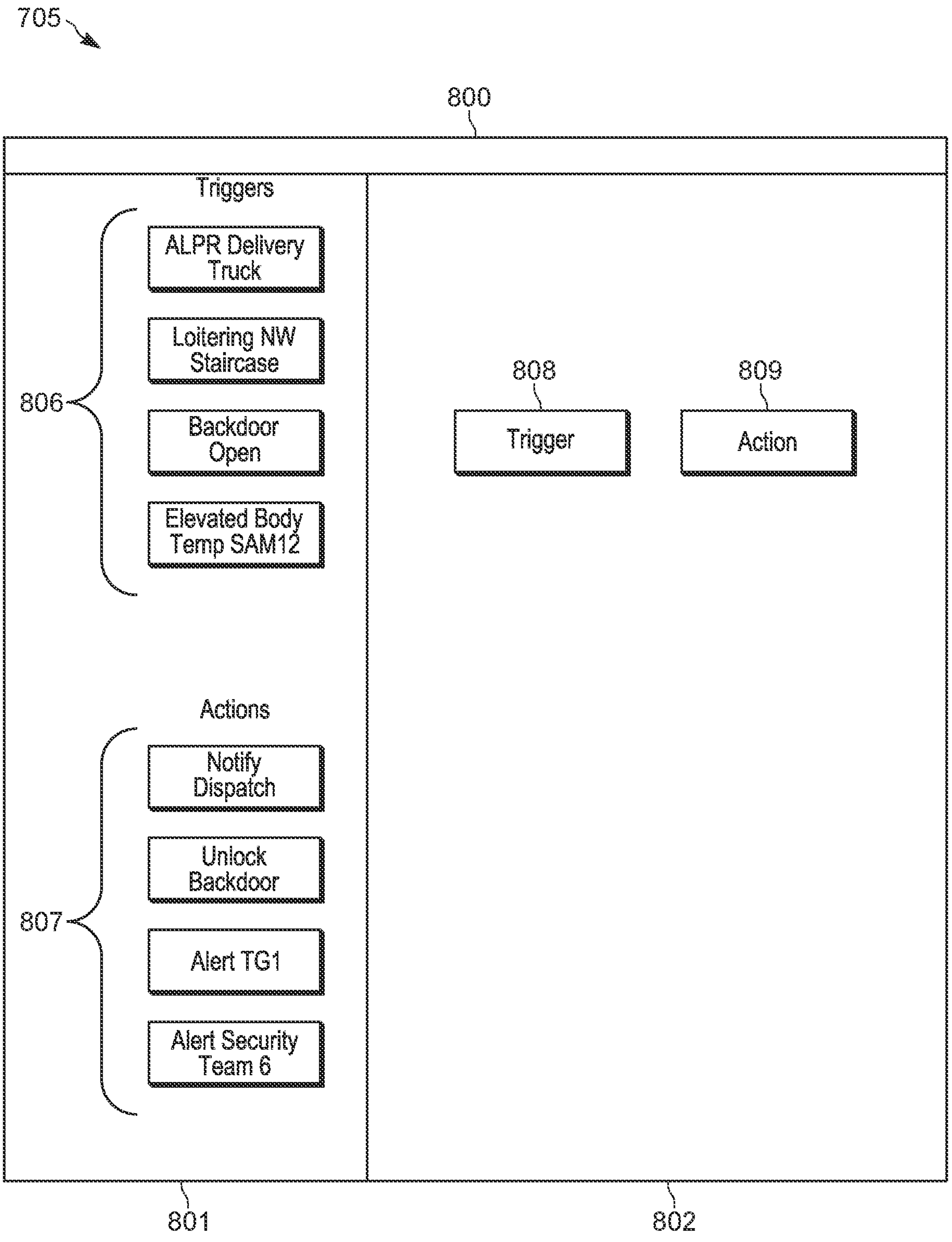
FIG. 8 depicts a dashboard for generating a workflow, in accordance with some examples.

FIG. 8 illustrates the generation of a workflow. More particularly, FIG. 8 illustrates a dashboard 800 rendered at the display screen 705 utilized for the generation of workflows. As depicted, the dashboard 800 consists of the following main components:

- a selection panel 801 (e.g., on a left-hand side), which lists available triggers 806 and actions 807;
- a workspace 802, which comprises a large area in the middle of the dashboard 800 used to generate workflows that define the connections between triggers and actions. Each workflow in the workspace is displayed as a separate field 808, 809 with an outline and a title. As shown in FIG. 8, two fields 808, 809 are shown, one labeled "trigger" and another labeled "action".

While the dashboard 800 is depicted in a particular configuration, the dashboard 800 may have any suitable configuration; for example, the selection panel 801 may be on a right-hand side, a top side or a bottom side relative to the workspace 802.

The triggers 806 represent the events originating from various sensors, software, and devices within the security ecosystem 100. The actions 807 represent the possible responses to the triggers that may be implemented via any suitable various sensors, software, and devices within the security ecosystem 100, including, but not limited to, the radios 137, 153.

After a workflow is deployed (i.e., uploaded to the workflow server 102), its actions activate when the triggers occur. Triggers and actions appear on the workspace after they are dragged and dropped from the triggers 806 and actions 807 tabs respectively. For example, as depicted, the field 808 represents a trigger 806 that may have been dragged and dropped to the workspace 802 and the field 809 represents an action 807 that may have been dragged and dropped to the workspace 802. Connecting the triggers and actions on the workspace (as described below) will generate a workflow.

The triggers 806 and the actions 807 are generally stored at the storage component 702 and represent integrations across multiple products. In other words, triggers 806 and the actions 807 comprise triggers and actions for any suitable components available in the security ecosystem 100. This includes cameras, sensors, IoT devices, radios, . . . , etc. As administrators add additional technology pieces to the security ecosystem 100, those pieces may be automatically made available for workflow generation as discussed herein.

In order to associate a trigger 806 with an action 807 in the workspace 802, a user selects a trigger 806 from all possible triggers 806, and drags and drops it onto workspace 802, as represented by the field 808. The user then selects an action 807 for the trigger 806 that is in the workspace 802, and drags and drops it onto workspace 802. Once in the workspace 802, a trigger 806 may be referred to as a trigger node, and an action 807 may be referred to as an action node. In order to associate the trigger 806 with the action 807, they are connected. To connect a trigger node to an action node, a user may click an end of the trigger node (e.g., that is closest to the action node) and drag a line to the action node, or vice versa. However, any suitable process for connecting nodes is within the scope of the present specification.

Figure 9:
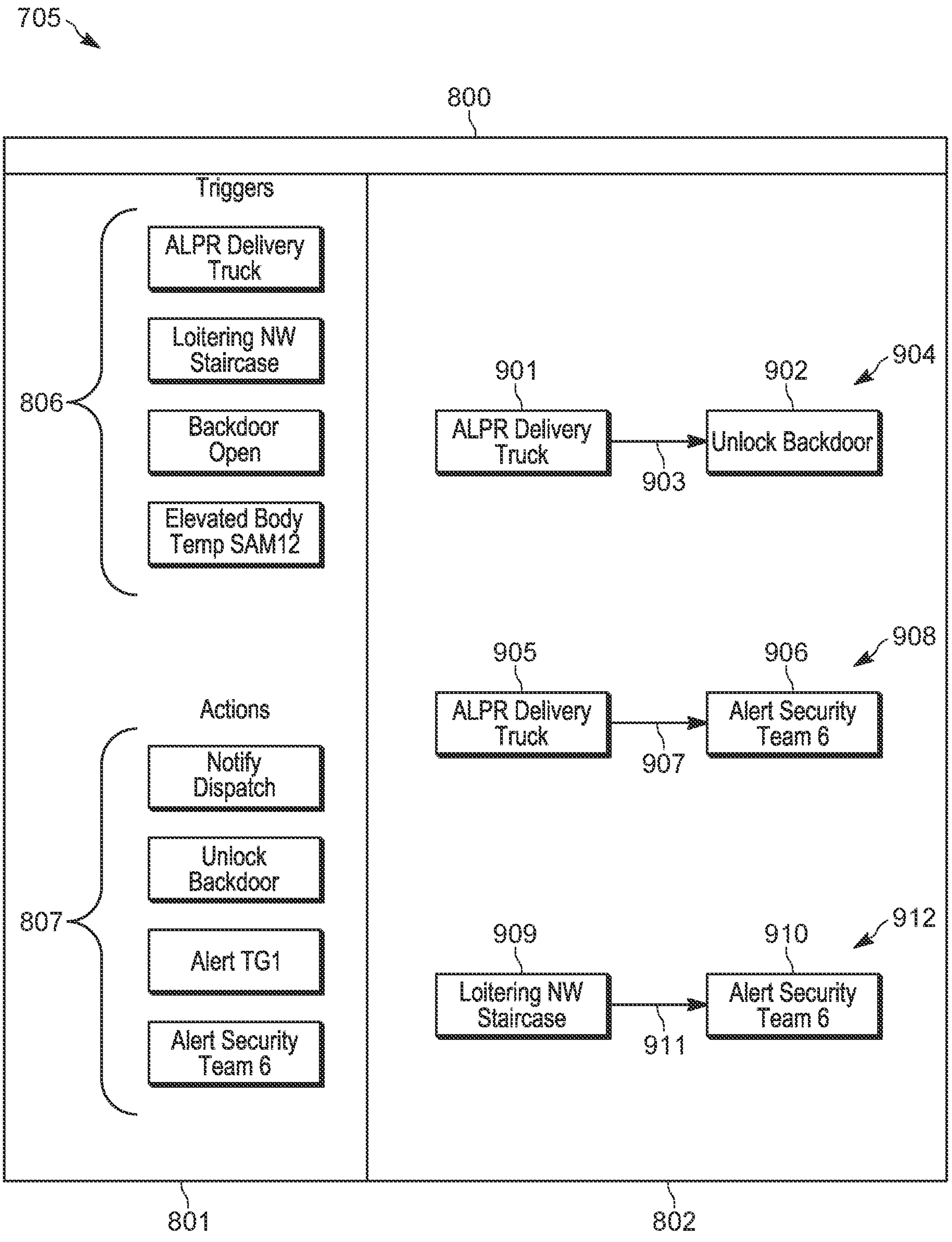
FIG. 9 depicts the dashboard of FIG. 8 with an example workflow, in accordance with some examples.

As shown in FIG. 9, which depicts the dashboard 800 in use, a trigger "ALPR Delivery Truck" 901 has been associated with an action "Unlock Backdoor" 902 by dragging a line 903 between the two, thereby forming a workflow 904. While only one trigger 901 and one action 902 is depicted in the workflow 904, the workflow 904 may comprise any suitable number of triggers (e.g., a trigger group) and any suitable numbers of associated action (e.g., an action group). Hence, if any of the triggers within a trigger group occurs, the workflow 904 is initiated causing the action to be executed. For example, as depicted ALPR stands for automated license plate reader, which may be one of the IoT devices 163; as such, according to the workflow 904, when automated license plate reader of the access control system 160 "reads" a license plate of a delivery truck (e.g., the trigger 901), an associated backdoor (e.g., of a warehouse) is opened; such a backdoor may also comprise one of the IoT devices 163. While note depicted, a memory in the system 100 may also store a list of license plates for which the backdoor is to be opened and the trigger 901 may include comparing a number of the license plate that is read with license plates in such a list, such that the backdoor is opened only when the license plate is on the list.

Furthermore, it is understood that the system 100 may comprise a plurality of IoT devices 163 that are automated license plate readers, and that the trigger 901 may be for a particular automated license plate reader; as such, while not depicted, the actions 807 may include respective "ALPR" actions 807 for other automated license plate reader. Similarly, it is understood that the system 100 may comprise a plurality of IoT devices 163 that are backdoors, and that the action 902 may be for a particular backdoor; as such, while not depicted, the actions 807 may include respective "Unlock Backdoor" actions 807 for other backdoors.

For example, as depicted the triggers 806 include a trigger 806 for detecting loitering at a particular "North West" (e.g., NW) staircase of a particular building (e.g., "Loitering NW Staircase") that may be detected using a VAE 143 of one or more cameras 142 and the like. The triggers 806 further includes a trigger 806 for detecting whether a particular backdoor is open (e.g., "Backdoor Open") that may be detected using a VAE 143 of one or more cameras 142 and/or an open/closed sensor on the backdoor and the like. The triggers 806 further includes a trigger 806 for detecting whether a particular individual, for example a first responder and/or police officer and/or security guard having an identifier "SAM12" has an elevated body temperature (e.g., "Elevated Body Temp SAM12") that may be detected using a biometric sensor of one or more sensors 138 and the like.

For example, as depicted the actions 807 include an action 807 for notifying a first responder and/or police and/or security dispatch (e.g., "Notify Dispatch") such as the dispatch center 131. The actions 807 further includes an action 807 for alerting a particular talkgroup identified by the identifier TG1 and/or Talkgroup #1 (e.g., "Alert TG1") such as a particular talkgroup of the radios 137 (and/or the radios 153). The actions 807 further includes an action 807 for alerting a particular security team identified by the identifier Security Team 6 (e.g., "Alert Security Team 6") which may be associated with a particular group of the radios 137 (and/or the radios 153) and which may, or may not, be associated via a talkgroup.

However, the triggers 806 and actions 807 may include any suitable triggers and actions, which may be dragged and dropped, and the like, into the workspace 802, and associated with each other to generate workflows.

For example, as also shown in FIG. 9, the trigger "ALPR Delivery Truck" 806 may be added to the workspace 802 a second time from the selection panel 801, as a trigger "ALPR Delivery Truck" 905, and associated with a different action "Alert Security Team 6" 906 (e.g., added as an action 807 from the selection panel 801) by dragging a line 907 between the two, thereby forming a workflow 908. Such an example illustrates that a given trigger 806 may be used more than once to generate a workflow 904, 908, in association with different actions 807. Similarly, a given action 807 may be used more than once in the workspace 802 to form workflows with different triggers 806.

Similarly, as also shown in FIG. 9, the trigger "Loitering NW Staircase" 806 may be added to the workspace 802 from the selection panel 801, as a trigger "Loitering NW Staircase" 909, and associated with action "Alert Security Team 6" 910 (e.g., added as an action 807 from the selection panel 801) by dragging a line 911 between the two, thereby forming a workflow 912. Such an example illustrates that a given action 807 may be used more than once to generate a workflow 908, 912, in association with different triggers 806.

Figure 10:
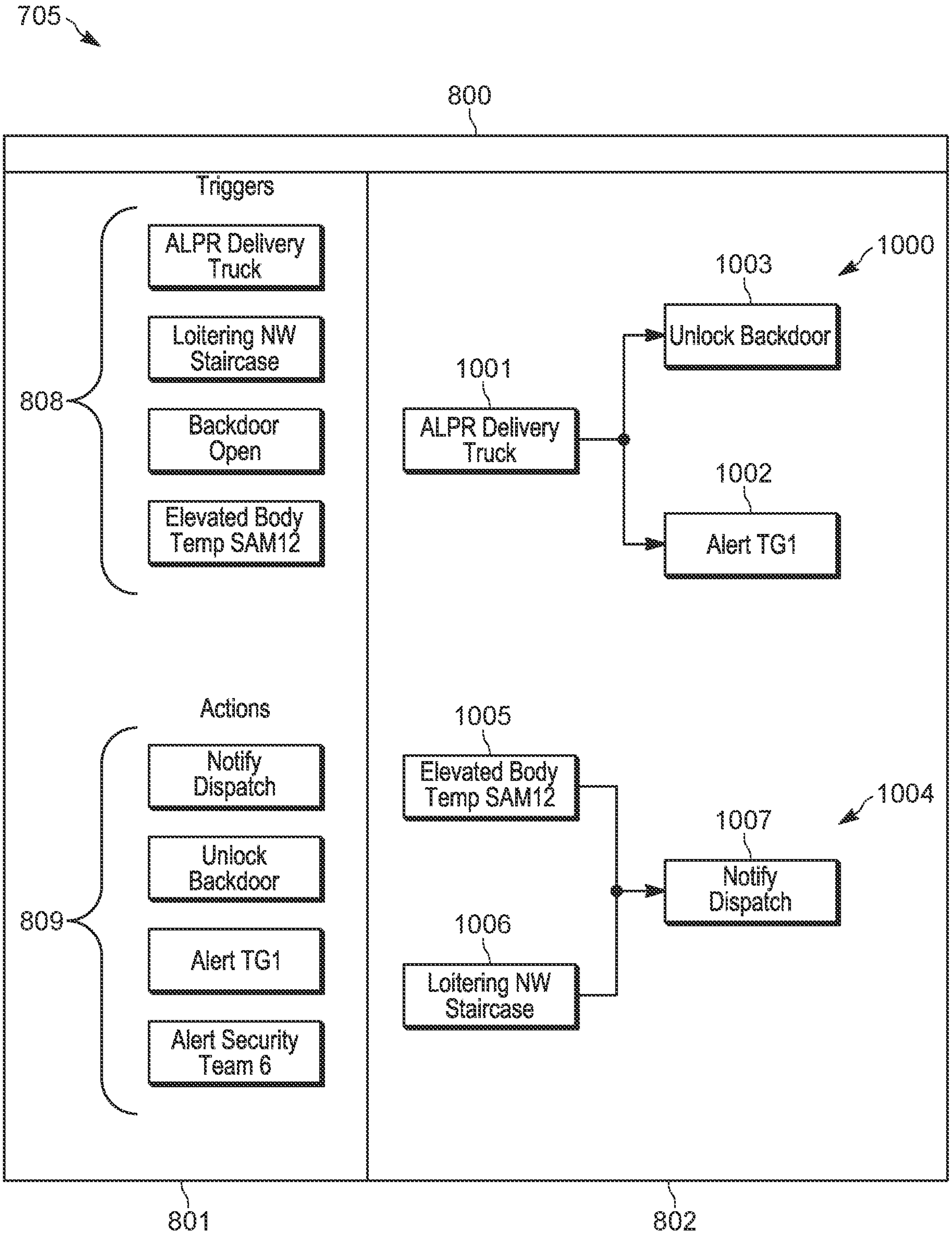
FIG. 10 depicts the dashboard of FIG. 8 with other example workflows, in accordance with some examples.

As illustrated in FIG. 10, a single trigger may be associated with multiple actions in a workflow. Thus, in an illustrated workflow 1000, a trigger 1001 of "ALPR Delivery Truck" may be associated with an action 1003 of "Unlock Back Door" 1003 as well as associated with an action 1002 of "Alert TG 1". When the workflow 1000 is uploaded to the workflow server 102, and the automatic license plate detects a delivery truck, workflow server 102 will cause both the back door to unlock and an alert to be sent on Talkgroup #1.

In a similar manner multiple triggers may be associated with a single action. Thus, in an illustrated workflow 1004, both a trigger 1005 of "Elevated Body Temp SAM 12" and a trigger 1006 of "Loitering NW Staircase" will cause an action 1007 of "Notify Dispatch" 1008. When the workflow 1004 is uploaded to the workflow server 102, the workflow server 102 notifies the dispatch center when either a police officer (and the like) identified by the identifier "SAM 12" has an elevated body temperature (e.g., above a threshold body temperature", or when loitering is detected in the NW staircase.

As mentioned above, it may be challenging to communicate to the one or more communication devices the sensor data that lead to the one or more triggers and/or to change and/or control the safety workflows.

In order to address such a problem, the workflow server 102 may be adapted to: monitor execution of a safety workflow, the safety workflow comprising one or more triggers and one or more responsive actions; provide, at a display screen, an indication of the safety workflow and respective visual indications of: a physical sensor that generated sensor data of a trigger of the safety workflow; and a communication device associated with a responsive action to the trigger; detect, via an input device, an interaction with one or more of the respective visual indications to interact with one or more of the physical sensor and the communication device; and based on the interaction, one or more of: retrieve the sensor data; initiate communication with the communication device; and send the sensor data to the communication device.

Hereafter, workflows may be interchangeably referred to as safety workflows as it is understood that workflows as described herein may be used to implement procedures and/or processes related to safety and/or public safety of persons and/or personnel, for example at a school, a hospital, an airport, a sporting event, a stadium, a factory, a warehouse and/or any other suitable location and/or building and the like. Hereafter, the workflow server 102 may be interchangeably referred to as a computing device (e.g., which may be implemented as one or more computing devices, one or more servers, one or more cloud computing devices, and the like). Hereafter, it is understood that any of the sensors 138, cameras 142, and IoT devices 163 comprise physical sensors that may generate sensor data that may be provided to the workflow server 102 to determine whether a trigger has occurred.

However, the system 100 and safety workflows provided herein may be further adapted to include other features.

Figure 11:
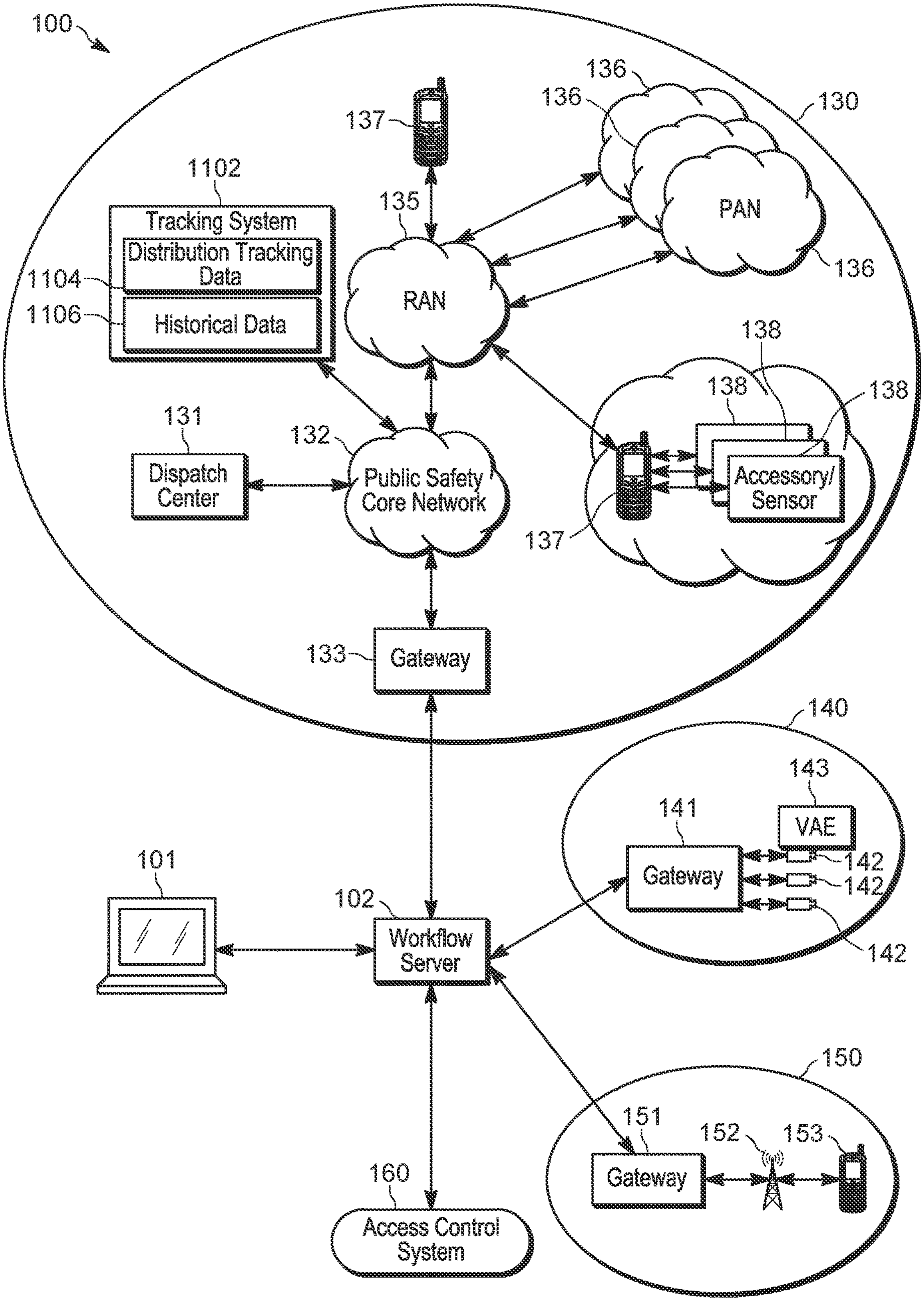
FIG. 11 depicts the system of FIG. 1 modified to include a tracking system to monitor and/or track distribution of physical resources, in accordance with some examples.

For example, attention is next directed to FIG. 11, which depicts the system 100, and in particular the public-safety network 130, modified to include a tracking system 1102 in communication with the public-safety core network 132. For example, the tracking system 1102 may comprise one or more computing devices, servers, and the like, which tracks distribution of physical resources, for example for a public safety incident such as a natural disaster, and the like. In a particular example, a weather-based event, such as flooding may occur, and a public safety agency may coordinate and manage distribution of physical resources to regions that have been affected by the flooding. Such physical resources may include, but are not limited to, mobile cell phone towers, generators, and the like, and/or such physical resources may include, but are not limited to care packages, medicines, and the like. However, any suitable public safety incident, and the like, and any suitable physical resources are within the scope of the present specification including but not limited to, medical based public safety incidents.

Furthermore, the physical resources may be distributed by any suitable combination of public safety agencies, private entity agencies (e.g., companies), volunteer agencies and the like. Operators of radios (e.g., such as the radios 137, 153) of such agencies may upload tracking data that indicates locations, and the like, the physical resources to the tracking system 1102, to assist the tracking system 1102 with tracking the physical resources. Hereafter, while other radios are within the scope of the present specification, the radios 137, 153 will be used as examples of radios that may be used to track distribution of physical resources.

Furthermore, it is understood that the radios 137, 153 may be reporting their respective locations (e.g., in the form of Global Positioning System (GPS) coordinates, and the like) to the tracking system 1102 (e.g., and/or workflow server 102). As such, in certain examples, the tracking system 1102 may maintain a relational database of the radios 137, 153 and physical resources being distributed (e.g., users of the radios 137, 153 may be specifically tasked with distributing given physical resources) and hence a location of a radio 137, 153 may indicate a location of respective physical resources.

In yet further examples, the cameras 142 may acquire images of certain physical resources being distributed, which may be "recognized" by a respective video analysis engine 143 such that indications of locations of the certain physical resources may be provided to the tracking system 1102 by a video analysis engine 143.

In yet further examples, while not depicted, vehicles distributed the physical resources may be equipped with location (e.g., GPS) sensors which may report their respective locations to the tracking system 1102. An association between the vehicles and respective physical resources may be maintained at the aforementioned relational database, and hence a location of a vehicle may indicate a location of respective physical resources. While such vehicles are not depicted, communication devices of such vehicles may be components of the public-safety network 130 and/or the private radio system 150, and the like. In particular, a radio 137, 153 may optionally represent a radio of a vehicle, and a sensor 138 of a radio 137 may comprise a location sensor (e.g., and a radio 153 may be equipped with a location sensor).

In general, the tracking system 1102 may report distribution tracking data 1104 to the workflow server 102 (e.g. via the network interface 601), the distribution tracking data 1104 comprising any suitable combination of data that indicates distribution of the physical resources including, but not limited to, respective identifiers of types of the physical resources (e.g., that identify what a physical resource is, such as mobile cell phone towers, care packages, and the like), respective locations of the physical resources, respective times for delivery of the physical resources (e.g., a length of time for a physical resource to be delivered, for example from a start time that a physical resource left a warehouse to a delivery time that the physical resource was delivered).

As depicted, the tracking system 1102 may maintain the distribution tracking data 1104, and historical data 1106 comprising records, and/the like, of historical public safety incidents in different regions. Such historical data 1106 may indicate relative severity of public safety incidents between the regions 1202. For example, the historical data 1106 may indicate that, when flooding occurs, such flooding may be less severe in a given region (e.g., a first county) and more severe in one or more other regions that are one or more of adjacent the given region and within a given distance from the given region other region (e.g., one or more second counties adjacent the first county and/or within a given distance from the first county). Continuing with the example of floods, such historical data 1106 may comprise indications of flood levels in different regions, indications of damage to flooding in the different regions, numbers of people displaced, and the like. However, the historical data 1106 may include any suitable data indicating severity of any suitable public safety incidents in any suitable manner.

In some examples, the historical data 1106 may comprise historical distribution tracking data 1104 that may be used to train one or more machine learning algorithms implemented by the workflow server 102, as described in further detail below.

While the tracking system 1102 is depicted as being a component of the public-safety network 130, the tracking system 1102 may alternatively be a component of the private radio system 150. In yet a further alternative, functionality of the tracking system 1102 may be integrated with the workflow server 102.

Figure 12:
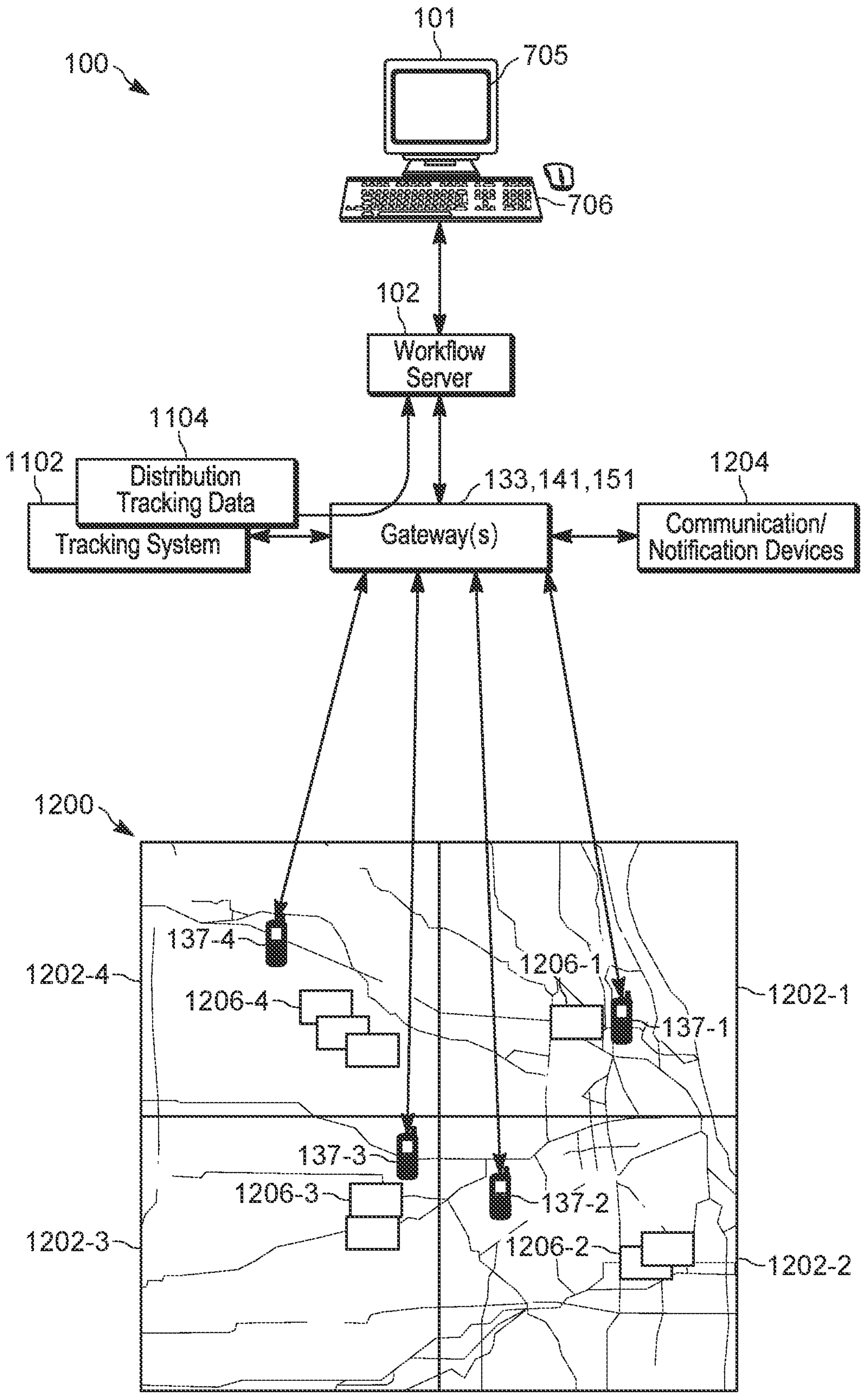
FIG. 12 depicts a portion of the system of FIG. 11 monitoring distribution of physical resources, in accordance with some examples.

Attention is next directed to FIG. 12 which depicts portions of an example of the system 100, with various radios 137-1, 137-2, 137-3, 137-4 located in a geographic area 1200 that comprises a plurality of regions 1202-1, 1202-2, 1202-3, 1202-4. The radios 137-1, 137-2, 137-3, 137-4 are interchangeably referred to hereafter, collectively, as the radios 137 and, generically, as a radio 137; this convention will be used hereafter. For example, the regions 1202-1, 1202-2, 1202-3, 1202-4 may be referred to as the regions 1202 and/or a region 1202.

While as depicted there is only one radio 137 per region 1202, there may be more than one radio 137 per region, or there may be no radios 137 in one or more of the regions 1202.

Furthermore, while for illustrative purposes only the radios 137 of the public-safety network 130 are depicted as deployed in the regions 1202, it is understood that radios 153 of the private radio system 150 may be deployed in the regions 1202.

Furthermore, while no cameras 142 of the video surveillance system 140 are depicted, one or more cameras 142 may be deployed at one or more of the regions 1202.

Also depicted in FIG. 12 are the workstation 101, with the display screen 705 and the one or more input devices 706 (interchangeably referred to hereafter as the input device 706 and/or the input devices 706), as well as the workflow server 102 in communication with the gateways 133, 141, 151. While for illustrative purposes the gateways 133, 141, 151 are depicted collectively as one component, it is understood that the gateways 133, 141, 151 may be deployed as separate components of the system 100. Furthermore, communication links between components of the system 100 shown in the form of double-ended arrows, and may comprise any suitable combination of wired and/or wireless communication networks including, but not limited to, the public-safety core network 132, and the like.

Also depicted in FIG. 12 is the tracking system 1102, in communication with other components of the system 100 (e.g., via the gateway 133, or any other suitable gateway).

While other components of the system 100 are not depicted, it is understood that any suitable components, as previously described, may be present when suitable. For example, while components of the public-safety network 130 are not depicted, they may nonetheless be present. However, components of the access control system 160 may or may not be present.

It is understood that the radios 137, 153 deployed in the system 100 may generally comprise communication devices that may be used to communicate with other suitable components of the system 100. Similarly, the radios 137, 153 deployed in the system 100 may generally comprise notification devices to which alerts, notifications, messages, and the like may be transmitted by other suitable components of the system 100. As depicted, the system 100 may further comprise other types of one or more communication and/or notification devices 1204 which may comprise, for example, third party notification devices (e.g., deployed and/or maintained by third party notification service entities, such as third party software companies that deploy pagers and/or pager services, among other possibilities), watchdog group notification devices (e.g., associated with watchdog group entities that may monitor deployment of physical resources for legal and/or equity purposes), and the like. Such communication and/or notification devices 1204 may be components of the public-safety network 130 and/or the private radio system 150, and may communicate with other suitable components of the system 100 via a suitable gateway 133, 151. Furthermore, third party notification devices may include radios (e.g. any of the radios 137, 153) and/or other notification devices 1204 that include applications, and the like, for receiving notifications and/or messages via servers, and the like, of third party notification service entities.

However, the system 100 may further comprise other types of notification devices, such as terminals of a public safety answering point (PSAP) overseeing distributing of the physical resources 1206. For example, the workstation 101 may be on example of such a terminal.

As depicted, respective physical resources 1206-1, 1206-2, 1206-3, 1206-4 (e.g., physical resources 1206 and/or a physical resource 1206) have been deployed to respective regions 1202, for example by operators of the radios 137 (and/or operators of other radios 153, not depicted), by vehicles (not depicted), and the like. While not depicted, locations, types, and times of delivery of the physical resources 1206 have been provided to the tracking system 1102, which collects such data and provides such data in the form of the distribution tracking data 1104 to the workflow server 102. While not depicted, the tracking system 1102 may also the historical data 1106 to the workflow server 102. The distribution tracking data 1104 may be provided periodically to the workflow server 102, and/or as the distribution tracking data 1104 is generated and/or updated, and/or the workflow server 102 may request the distribution tracking data 1104 from the tracking system 1102, for example periodically, which provides the distribution tracking data 1104, accordingly. When functionality of the tracking system 1102 is integrated with the workflow server 102, it is understood that the workflow server 102 may have access to the distribution tracking data 1104 without communication with a tracking system.

As depicted in FIG. 12, the physical resources 1206 are represented by boxes, and hence relative amounts of physical resources 1206 distributed to the regions 1202 are represented by numbers of the boxes.

In particular, as depicted, the physical resources 1206 have been distributed non-uniformly to the regions 1202. For example, as depicted, there are eight boxes in total representing the physical resources 1206; as such, from FIG. 12 it is understood that 12.5% of the physical resources 1206 have been distributed to the first region 1202-1 (e.g., there is one box out of eight in the first region 1202-1, and 1/8=12.5%), 25% of the physical resources 1206 have been distributed to the second region 1202-2 (e.g., there are two boxes in the second region 1202-2), 25% of the physical resources 1206 have been distributed to the third region 1202-3 (e.g., there are two boxes in the third region 1202-3), and 37.5% of the physical resources 1206 have been distributed to the fourth region 1202-4 (e.g., there are three boxes in the fourth region 1202-4).

As depicted, it is understood that the workflow server 102 may be implementing and/or monitoring security and/or safety workflows associated with the geographic area 1200 associated with distribution of physical resources that may have been generated using the dashboard 800.

Figure 13:
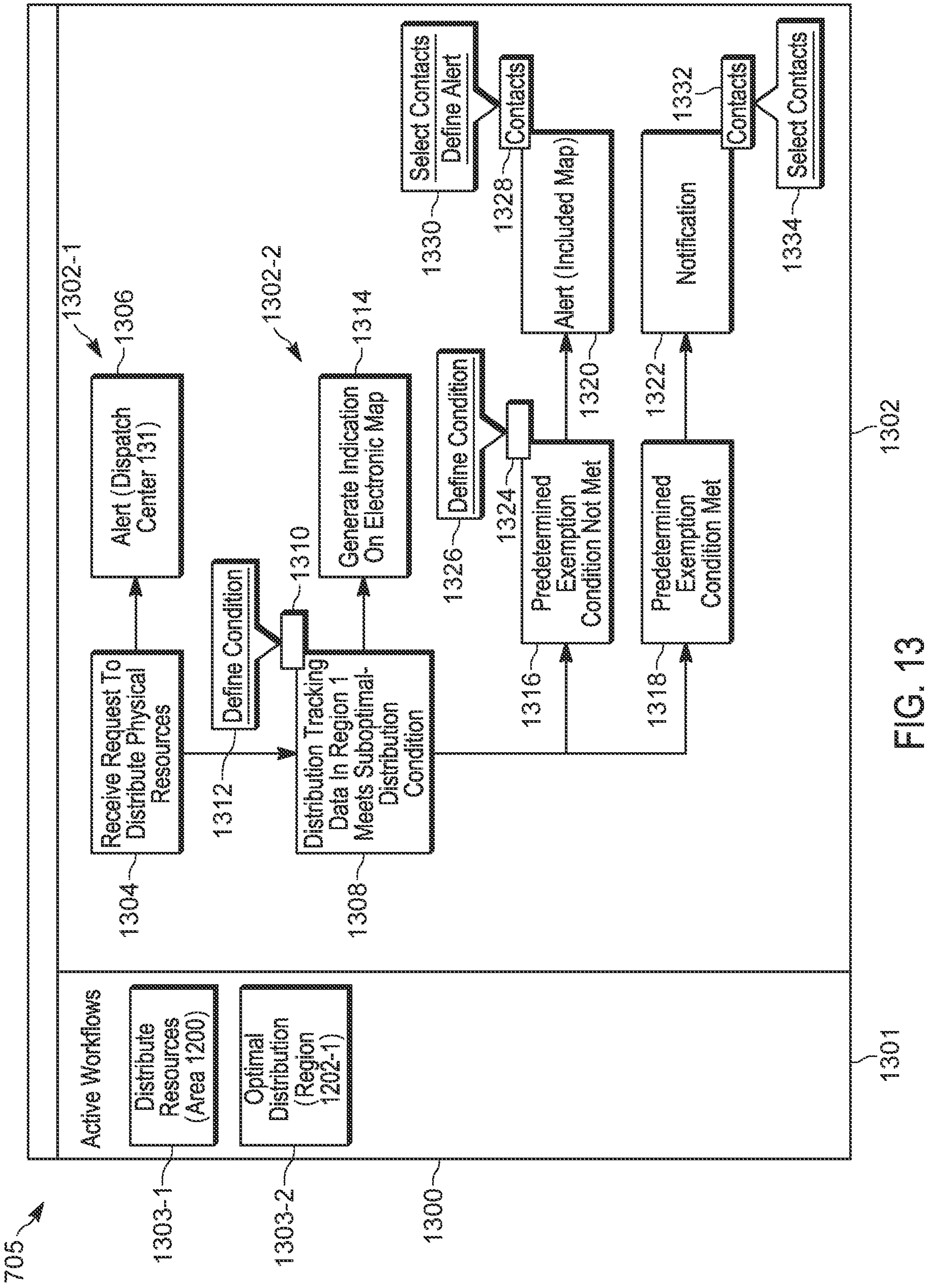
FIG. 13 depicts a dashboard for monitoring workflows according to a workflow view, the workflows to distribute and monitor physical resources, in accordance with some examples.

For example, attention is next directed to FIG. 13 which depicts a dashboard 1300 to monitor workflows; the dashboard 1300 may be similar to the dashboard 800, but which has been adapted to include a selection panel 1301 and a workspace 1302. The selection panel 1301 is generally for selecting indications of previously generated security and/or safety workflows 1303-1, 1303-2, which may be referred to hereafter, respectively, as a first workflow 1303-1 and a second workflow 1303, and/or interchangeably referred to, hereafter, collectively as the security and/or safety workflows 1303 and/or, generically, as a security workflow 1303. In particular, as depicted, the selection panel 1301 may specifically show active workflows 1303, for example, workflows for which a trigger has occurred, and may be used to select a workflow 1303 with which to interact, for example to edit and/or to make menu selections, as described below. As depicted, the first workflow 1303-1 and the second workflow 1303-2 may have been initiated in response to a request for the physical resources 1206 to be distributed to address a public safety incident associated with the geographic area 1200 (and/or one or more of the regions 1202).

For example, the first workflow 1303-1 may be to distribute the physical resources 1206 to the regions 1202 of the geographic area 1200, and the second workflow 1303-2 may be to optimally distribute the physical resources 1206 to at least the first region 1202-1 of the geographic area 1200. Hereafter the first region 1202-1 will be interchangeably referred to as the given region 1202-1, as different workflows 1303 may be provided that are similar to the second workflow 1303-2, and which may be specific to other given regions 1202.

The workflows 1303 may be implemented independent of each other and/or, as depicted, the second workflow 1303-2 may be triggered when the first workflow 1303-1 is implemented.

The workspace 1302 is generally to show indications of respective triggers and actions for the active security and/or safety workflows 1303-1, 1303-2. As such, the view of the dashboard 1300 depicted in FIG. 13 may be referred to as a workflow view and/or workflow mode of the dashboard 1300.

Hereafter, while it is understood that workflows, triggers and actions are components that may be implemented at the workflow server 102, and indications of workflows, triggers and actions depicted at the dashboard 1300 are visual indications of workflows, triggers and actions, for simplicity, hereafter, when discussing such indications with reference to the dashboard 1300, reference will be made to respective workflows, triggers and actions rather than indications thereof.

Furthermore, the security and/or safety workflows 1303 may have been generated using the dashboard 800. In particular, the dashboards 800, 1300 may be components of a dashboard application being implemented by the workflow server 102 and/or the workstation 101, for example using Motorola Solution™'s Command Central™ software suite comprising the Orchestrate™ platform (e.g., at the workflow server 102) and/or the Motorola Solution™'s Orchestrate™ and Ally™ dispatch and incident management software (e.g., at the workstation 101). Indeed, the dashboard 800 may be to generate and edit workflows, while the dashboard 1300 may be to monitor and/or select workflows that have been provided to the workflow server 102, for example to show status of respective triggers and actions, as well as to edit workflows and/or interact with sensors and/or communication devices associated with workflows as described hereafter.

Furthermore, while the dashboard 1300 shows only two workflows 1303, any suitable number of workflows 1303 may be shown at the dashboard 1300. Furthermore, as other workflows 1303 become active, such active workflows 1303 may appear, for selection, at the selection panel 1301, and respective triggers and actions may appear at the workspace 1302 (e.g., as controlled by the workflow server 102); similarly, as other workflows 1303 become inactive, such inactive workflows 1303 may disappear from the selection panel 1301, and respective triggers and actions may disappear from the workspace 1302 (e.g., as controlled by the workflow server 102). Hence, as depicted, it is understood that the first and second workflows 1303-1, 1303-2 are active.

As depicted at the workspace 1302, the first workflow 1303-1 comprises a trigger 1304 comprising: receiving a request for the physical resources 1206 to be distributed to address a public safety incident associated with the geographic area 1200 (and/or one or more of the regions 1202). Such a request may be received from the workstation 101 (e.g., via operation of an input device 70) a radio 137, 153, and/or any suitable device.

The first workflow 1303-1 further comprises an action 1306 of alerting the dispatch center 131 when the trigger 1304 occurs; such an action 1306 may include the workflow server 102 automatically transmitting a command to the dispatch center 131 when the trigger 1304 occurs (e.g., a message in any suitable format), to dispatch the physical resources 1206. Types of physical resources 1206 that are dispatched may be determined by the workflow server 102 and/or via an operator interacting with the workstation 101, and may depend on a type of public safety incident that has occurred. For example, when a flood occurs, sandbags, mobile cell phone towers and care packages may be dispatched. Determination of the type of public-safety event may occur by way of a message to the workflow server 102 from one or more of the radios 137, 153, for example, among other possibilities, and a determination of types of physical resources 1206 that are dispatched may occur via a relational database (not depicted) that associates types of public safety incidents with types of physical resources 1206. Furthermore, alerting the dispatch center 131 when the trigger 1304 occurs may include an indication of where to distribute the physical resources 1206, which may be determined using the relational database (e.g., which may also store indications of where to distribute given physical resources 1206 for a given types of public safety incidents, and the like), and/or distribution of the physical resources 1206 may be human determined and/or machine learning determined, and the like.

Regardless, it is understood that the workflow server 102 has access to the distribution tracking data 1104.

As depicted at the workspace 1302, the second workflow 1303-2 comprises a trigger 1308 comprising determining, based on the distribution tracking data 104, that distribution of the physical resources 1206-1 in the given region 1202-1 meets a suboptimal-distribution condition.

For example, a suboptimal-distribution condition may comprise one or more of the following:

A relative-distribution condition based on the distribution of the physical resources 1206 in the given region 1202-1 as compared to respective distribution of the physical resources 1206 in one or more other regions 1202 that are one or more of adjacent the given region 1202-1 or within a given distance from the given region 1202-1. For example, the relative-distribution condition may be threshold based; in particular the relative-distribution condition may comprise a given percentage threshold (e.g., such as 25%, among other possibilities, such as 30%, 50%, etc.) of the physical resources 1206, such that when such a percentage of the physical resources 1206 that are distributed to the given region 1202-1 is below the given percentage threshold, the relative-distribution condition may be met. Hence, when the distribution tracking data 104 indicates that less than given percentage threshold of the physical resources 1206 have been delivered to the given region 1202-1, the relative-distribution condition may be met, and the trigger 1308 may occur. Such a given percentage threshold defined may be dynamic and based on the number of regions 1202: for example, when there are "N" number of regions 1202, the given percentage threshold may be (1/N)×100%. Alternatively, such a given percentage threshold defined may be dynamic and based on relative population of the regions 1202: for example, the given percentage threshold may comprise a percentage of people of the geographic area 1200 that live in the given region 1202-1, such as 50%, among other possibilities.

A delivery condition based on delivery locations of the physical resources 1206 in the given region 1202-1. For example, the delivery condition may comprise any suitable combination of parameters that define where physical resources 1206 are to be delivered in the given region 1202-1, such as addresses and/or groups of addresses, and the like in the given region 1202-1 (e.g., such as addresses and/or groups of addresses in residential neighborhoods). Hence, when the distribution tracking data 104 indicates that the physical resources 1206 have been delivered to addresses (e.g., of warehouses) other than those indicated by the delivery condition, the delivery condition may be met, and the trigger 1308 may occur. In particular, the delivery condition may be based on delivery logistics processes for addressing the public safety incident, which may specify that respective physical resources 1206 are first to be delivered to one or more warehouses in the given region 1202-1 and then later delivered to addresses and/or groups of addresses defined by the delivery condition. Hence, when the delivery condition is met, the respective physical resources 1206 may not have been properly distributed, and the trigger 1308 may occur. However, in some further examples, the delivery condition may be threshold-based, and may comprise a given threshold distance (e.g., such as 500 meters, among other possibilities, such 100 meters, 1 kilometer, etc.) that the respective physical resources 1206 are to be from one or more specified locations. Hence, when the distribution tracking data 104 indicates that the physical resources 1206 are more than the given threshold distance from one or more given locations, the delivery condition may be met, and the trigger 1308 may occur.

A time-for-delivery condition based on times to deliver the physical resources 1206 in the given region 1202-1 compared to respective times to deliver the physical resources 1206 in the one or more other regions 1202. For example, the time-for-delivery condition may comprise a time-based threshold that indicates that times for delivery of the physical resources 1206 to the given region 1202-1 should be within a given threshold time period (e.g., such as 30 minutes, among other possibilities, such as 1 hour, 90 minutes, etc.) of respective times for delivery of the physical resources 1206 to the one or more other regions 1202. Hence, when the distribution tracking data 104 indicates that the physical resources 1206 have been delivered to the given region 1202-1 in a time period that exceeds the given threshold time period, after respective physical resources 1206 have been delivered to the other regions 1202, the time-for-delivery condition may be met, and the trigger 1308 may occur.

However, any suitable suboptimal-distribution conditions are within the scope of the present specification. Furthermore, the suboptimal-distribution condition may be machine learning based. For example, the workflow server 102 may implement one or more machine learning algorithms that have been trained to determine when any suitable suboptimal-distribution condition is met, based, for example, on training data sets that indicate when historical distribution of physical resources was optimal or suboptimal, for example as indicated by the historical data 1106 (e.g., and/or historical distribution tracking data).

Furthermore, different suboptimal-distribution conditions may be provided for different types of the physical resources 106 (e.g. as indicated by the distribution tracking data 1104). For example, for physical resources 106 that are cell towers, a warehouse based delivery may be sufficient, whereas for physical resources 106 that are care packages or medicine, only delivery to specific addresses may be sufficient As depicted, the trigger 1308 includes an electronic button 1310. In particular, a menu 1312 associated with the electronic button 1310 may be provided at the display screen 705 when the electronic button 1310 is selected. As depicted, the menu 1312 includes a selectable option of "Define Condition", which, when selected, may cause a pop-up box to be provided at the display screen 705 which may enable an operator to change and/or select and/or edit the suboptimal-distribution condition (or suboptimal-distribution conditions). For example, the given percentage threshold of the relative-distribution condition may be edited and/or selected, addresses and/or distances of the delivery condition may be edited and/or selected, and/or the given threshold time period for the time-for-delivery condition may be edited and/or selected, and the like. Such selection may further be for different types of the physical resources 106.

Furthermore, the selectable option of "Define Condition" may enable an operator to select regions 1202 that are to be compared to the given region 1202-1 when determining whether the suboptimal-distribution condition is met. While the regions 1202 may be preselected and/or may comprise default regions 1202, for example such as all regions 1202 within the geographic area 1200 being monitored, in other examples, the selectable option of "Define Condition" may enable an operator to select or exclude certain regions 1202 and/or the selectable option of "Define Condition" may enable an operator to select or define a given distance from the given region 1202-1 that define which other regions 1202 (e.g., that fall within the given distance) that are to be included to compared to the given region 1202-1 when determining whether the suboptimal-distribution condition is met. However, such a given distance may be predetermined, such as 10 kms, 50 kms, and the like, among other possibilities. In yet further examples, the regions 1202 that are to be compared to the given region 1202-1 when determining whether the suboptimal-distribution condition is met may include all regions 1202 to which the physical resources have been distributed, as indicated by the distribution tracking data 1104. Furthermore, such selection may be for different types of the physical resources 106, with distribution of cell towers, for example, compared between the given region 1202-1 and a first subset of the regions 1202, and a distribution of care packages, for example, compared between the given region 1202-1 and a second subset of the regions 1202, different from the first subset.

Furthermore, the selectable option of "Define Condition" may enable an operator to select which of the suboptimal-distribution conditions are to be used to evaluate the distribution tracking data 1104, and/or to weight such conditions. For example, only one of the relative-distribution condition, the delivery condition, and the time-for-delivery condition may be selected. However, when two or more of the relative-distribution condition, the delivery condition, and the time-for-delivery condition is selected, weights may be assigned to the conditions such that, when a highest weighted condition is met (e.g., such as the relative-distribution condition), but one or more lower weighted conditions are not met (e.g., the delivery condition, and the time-for-delivery condition), the suboptimal-distribution condition may be met. Conversely, when a highest weighted condition is not met (e.g., such as the relative-distribution condition), but one or more lower weighted conditions are met (e.g., the delivery condition, and the time-for-delivery condition) the suboptimal-distribution condition may not be met.

Furthermore, the selectable option of "Define Condition" may enable an operator to switch between using numerical-algorithm (and/or threshold-based) determinations of whether the suboptimal-distribution condition is met, and machine learning based determinations of whether the suboptimal-distribution condition is met.

Furthermore, while the second workflow 1303-2 and the trigger 1308 is defined with respect to the first region 1202-1 as the given region 1202-1, the selectable option of "Define Condition" may enable an operator to select another region 1202 for which to determine whether the suboptimal-distribution condition is met, such as the second region 1202-2 or the third region 1202-3. Such a selection of a different region 1202 may then be applied to remaining components of the second workflow 1303-2. Alternatively, the second workflow 1303-2 may be dedicated to the first region 1202-1 and different workflows 1303, similar to the second workflow 1303-2, may be provided and/or generated, for example using the dashboard 800

As depicted, the second workflow 1303-2 further comprises a first responsive action 1314 that may occur in response to the trigger 1308. In particular, the first responsive action 1314 comprises generating an indication of the distribution of the physical resources 1206 in the given region 1202-1 at an electronic map. Such an electronic map may include locations of the physical resources 1206, for example, and/or locations of other personnel (and/or vehicles) distributing the physical resources 1206 (e.g., as indicated by locations of the radios 137, and the like). An example of such an electronic map is described below with respect to FIG. 15.

Hence, such an electronic map may be similar to the geographic area 1200 as depicted in FIG. 12, and which may include only the given region 1202-1, or may include the given region 1202-1 and one or more of the other regions 1202, or may include all the regions 1202 of the geographic area 1200, or may include an area larger than the geographic area 1200. As such, it is understood that the workflow server 102 may have access to map server which may be used to generate such an electronic map (e.g., based on addresses, and the like), and/or the workflow server 102 may include such map server functionality. In particular, the first responsive action 1314 may specifically include generating an indication of the distribution of the physical resources 1206 in the given region 1202-1 at an electronic map that is rendered and/or provided at a display screen of a device being used to monitor a public safety incident that is occurring in the geographic area 1200, such as the display screen 705 of the workstation 101.

As depicted, the second workflow 1303-2 further comprises an analysis component 1316 which may occur in response to the trigger 1308. For example, as depicted, the analysis component 1316 may comprise: determining that the distribution of the physical resources 1206 meeting the suboptimal-distribution condition does not meet a predetermined exemption condition.

Furthermore, as depicted, the second workflow 1303-2 may further comprise another analysis component 1318 which may occur in response to the trigger 1308. For example, as depicted, the analysis component 1318 may comprise: determining that the distribution of the physical resources 1206 meeting the suboptimal-distribution condition does not meet a predetermined exemption condition.

Indeed, together, the analysis components 1316, 1318 may comprise an analysis component comprising determining whether the distribution of the physical resources 1206 meeting the suboptimal-distribution condition meets, or does not meet, a predetermined exemption condition.

Indeed, the analysis components 1316, 1318 may be implemented in tandem; however as only one of the analysis components 1316, 1318 may be successful (e.g., the distribution of the physical resources 1206 meeting the suboptimal-distribution condition either meets, or does not meet, a predetermined exemption condition), only one of associated respective actions 1320, 1322 may occur, as described below.

While as depicted two analysis components 1316, 1318 are used to determine whether the distribution of the physical resources 1206 meeting the suboptimal-distribution condition meets, or not, a predetermined exemption condition, workflows as provided herein may be adapted to include analysis components that act as decision boxes, which trigger different actions depending on whether a condition defined by such an analysis component is met or is not met.

However, the analysis components 1316, 1318 may be provided as respective triggers that cause respective actions 1320, 1322 to occur.

The predetermined exemption condition of the analysis components 1316, 1318 may comprise one or more of:

A severity-exemption condition based on determining that respective distribution of the physical resources 1206 to one or more other regions 1202, that are one or more of adjacent the given region 1202-1, or within a given distance from the given region 1202-1, is higher due to relative higher severity of a public safety incident (e.g. such a public safety incident leading to the distribution of the physical resources 1206 meeting the suboptimal-distribution condition, such as the distribution of the physical resources 1206 being greater in the one or more other regions 1202 than the given region 1202-1). For example, data from the radios 137, 153, the cameras 142, and/or data from other sources, such as weather servers, social media servers, and the like, may indicate that severity of a public safety incident that lead to the distribution of the physical resources is greater in the one or more other regions 1202 than the given region 1202-1. Returning to the example of flooding, data from the radios 137, 153, the cameras 142, and/or data from other sources may indicate that flooding in the fourth region 1202-4, which has more physical resources 1206 distributed thereto than the given region 1202-1, has worse flooding and/or damage than the given region 1202-1. In other words, in such examples, a severity-exemption condition is met (e.g., the analysis component 1316 is unsuccessful and/or has a negative result and the action 1320 does not occur, and the analysis component 1316 is successful and/or has a positive result and the action 1322 occurs). However, when severity of the public safety incident is not more severe in the one or more other regions 1202, as compared to the given region 1202-1, the severity-exemption condition is not met (e.g., the analysis component 1316 is successful and/or has a positive result and the action 1320 occurs, and the analysis component 1316 is unsuccessful and/or has a negative result and the action 1322 does not occur).

An historical-data-exemption condition based on the historical data 1106 indicating that historical public safety incidents, similar to a public safety incident (e.g., that lead to the distribution of the physical resources 1206 meeting the meeting the suboptimal-distribution condition), have a relative higher severity in the one or more other regions 1202 than the given region 1202-1. Again returning to the example of flooding, the historical data 1106 may indicate that severity of historical flooding was greater in the fourth region 1202-4, which has more physical resources 1206 distributed thereto than the given region 1202-1, than the given region 1202-1. Hence, in such examples, a historical-data-exemption condition is met (e.g., the analysis component 1316 is unsuccessful and/or has a negative result and the action 1320 does not occur, and the analysis component 1316 is successful and/or has a positive result and the action 1322 occurs). However, when historical data 1106 indicates that historical public safety incidents are not more severe in the one or more other regions 1202, as compared to the given region 1202-1, the historical-data-exemption condition is not met (e.g., the analysis component 1316 is successful and/or has a positive result and the action 1320 occurs, and the analysis component 1316 is unsuccessful and/or has a negative result and the action 1322 does not occur).

However, any predetermined exemption conditions are within the scope of the present specification.

Furthermore, a predetermined exemption condition may be based on types of physical resources 106 and/or relative sizes and/or relative populations of the regions 1202. For example, more mobile cell phone towers being distributed to the fourth region 1204-4, as compared to the given region 1202-1 may meet a mobile-cell-phone-tower-based exemption condition when the fourth region 1204-4 is larger than the given region 1202-1, but has a smaller population than the given region 1202-1. Conversely, using this same example, more care packages being distributed to the fourth region 1204-4, as compared to the given region 1202-1 may not meet a care-package-based exemption condition when the fourth region 1204-4 is larger than the given region 1202-1, but has a smaller population than the given region 1202-1.

Furthermore, the predetermined exemption condition may be numerical-algorithm based and, and/or or machine learning based.

For example, determination of relative severity for public safety incidents between the regions 1202, for use with the severity-exemption condition and/or the historical-data-exemption condition, may be numerical-algorithm based, and which may differ for different types of public safety incidents.

For example, in the example of flooding, high-points, and/or area size, of flood waters between the regions 1202 may be compared (e.g., currently or historically), and when the given region 1202-1 has (or had) flood waters that are (or were) lower, and/or over a smaller area, than flood waters of other regions 1202, the flood may be determined to be less severe in the given region 1202-1 than in the other regions 1202. Hence, when distribution of the physical resources 1206 to the given region 1202-1 meets the suboptimal-distribution condition, such distribution may meet the severity-exemption condition and/or the historical-data-exemption condition, and or any other suitable predetermined exemption condition.

Conversely, when the given region 1202-1 has (or had) flood waters that are (or were) higher, and/or over a larger area, then flood waters of other regions 1202, the flood may be determined to be more severe in the given region 1202-1 than in the other regions 1202. Hence, when distribution of the physical resources 1206 to the given region 1202-1 meets the suboptimal-distribution condition, such distribution may not meet the severity-exemption condition and/or the historical-data-exemption condition, and or any other suitable predetermined exemption condition.

In another example, for a public safety incident, numbers of people displaced between the regions 1202 may be compared (e.g., currently or historically), and when the given region 1202-1 has (or had) fewer people displaced than the other regions 1202, the public safety incident may be determined to be less severe in the given region 1202-1 than in the other regions 1202. Hence, when distribution of the physical resources 1206 to the given region 1202-1 meets the suboptimal-distribution condition, such distribution may meet the severity-exemption condition and/or the historical-data-exemption condition, and or any other suitable predetermined exemption condition.

Conversely, when the given region 1202-1 has (or had) more people displaced than the other regions 1202, the public safety incident may be determined to be more severe in the given region 1202-1 than in the other regions 1202. Hence, when distribution of the physical resources 1206 to the given region 1202-1 meets the suboptimal-distribution condition, such distribution may not meet the severity-exemption condition and/or the historical-data-exemption condition, and or any other suitable predetermined exemption condition.

Examples based on severity of an on-going public safety incident assumes that the workflow server 102 has access to data that indicates severity in the different regions 1202; such data may be determined from communications from the radios 137, 153, and/or such data may be retrieved from a weather server, and/or social media servers, and/or public safety incident records, and the like.

In other examples, the workflow server 102 may implement one or more machine learning algorithms that have been trained to determine when the predetermined exemption condition is met or not met, based, for example, on training data sets that indicate when historical distribution of physical resources met, or did not meet, exemption conditions, for example as indicated by the historical data 1106.

Regardless, when a predetermined exemption condition is not met the action 1320 occurs in response to the analysis component 1316 being successful, however when a predetermined exemption condition is met the action 1322 occurs in response to the analysis component 1318 being successful.

As depicted, the analysis component 1316 includes an electronic button 1324. In particular, a menu 1326 associated with the electronic button 1324 may be provided at the display screen 705 when the electronic button 1324 is selected. As depicted, the menu 1326 includes a selectable option of "Define Condition", which, when selected, may cause a pop-up box to be provided at the display screen 705 which may enable an operator to change and/or select and/or edit the predetermined exemption condition. For example, the predetermined exemption condition may comprise one, or both, of the aforementioned severity-exemption condition and historical-data-exemption condition being met, and selectable option of "Define Condition" may enable an operator to select one, or both, of the aforementioned severity-exemption condition and historical-data-exemption condition that needs to be met so that the predetermined exemption condition is met, and/or to weight such exemption conditions (e.g., similar to weighting described above with respect to the selectable option of "Define Condition" of the menu 1312).

While the analysis component 1318 does not include an electronic button, similar to the electronic button 1324, in other examples, the analysis component 1318 may include such an electronic button. Regardless, the selectable option of "Define Condition" of the menu 1326 may be used to define the predetermined exemption condition for both analysis components 1316, 1318.

Regardless, it is understood that a predetermined exemption condition may be user configurable.

As depicted, the second workflow 1303-2 further comprises the second responsive action 1320 (e.g., second relative to the first responsive action 1314), implemented in response to a positive result at the analysis component 1316. The second responsive action 1320 comprises: providing an alert to one or more notification devices identifying that the distribution of the physical resources 1206 meets the suboptimal-distribution condition.

As depicted, the second responsive action 1320 includes an electronic button 1328 (e.g., labelled "Contacts"). In particular, a menu 1330 associated with the electronic button 1328 may be provided at the display screen 705 when the electronic button 1328 is selected. As depicted, the menu 1330 includes a selectable option of "Select Contacts", which, when selected, may cause a pop-up box to be provided at the display screen 705 which may include a contact list, which may enable an operator to select notification devices (e.g., one or more of the radios 137, 153, one or more of the communication/notification devices 1204, and/or the workstation 101) to which the alert of the second responsive action 1320 is to be sent. For example, the alert may be sent to radios 137 in other regions 1202 that have received more of the physical resources than the given region 1202-1, and the contact list may enable an operator to select such radios 137.

However, the contact list may further enable an operator to select one or more of the communication/notification devices 1204 (e.g., associated with third party service entities and/or watchdog groups), and/or the workstation 101.

It is further understood that one or more contacts and/or notification devices may be preselected (e.g., by the workflow server 102) as one or more default contacts and/or notification devices (e.g., using numerical based algorithms and/or machine learning algorithms). For example, one or more radios 137 in other regions 1202 that have received more of the physical resources than the given region 1202-1 may be preselected as one or more default contacts. In these examples, the selectable option of "Select Contacts" may enable an operator to update and/or change and/or confirm such default contacts.

Furthermore, as depicted, the menu 1330 includes a selectable option of "Define Alert", which, when selected, may enable an operator to enter and/or select text to be included in the alert of the second responsive action 1320.

However, in yet further examples, the alert may be generated by the workflow server 102, for example based on the distribution tracking data 1104.

For example, when the distribution tracking data 1104 indicates that a relative-distribution condition has not been met, the workflow server 102 may generate an alert that may comprise instructions to recalibrate the distribution of the physical resources 1206 to the given region 1202-1, and indicate that certain types and/or certain amounts of the physical resources 1206 are to be transported from one of the other regions 1201 to the given region 1202-1. For example, as there are more physical resources 1206 in the fourth given region 1202-4 than the given region 1202-1, the alert may be provided to the radio 137-4 (e.g., selected as a default contact) and include instructions to move enough of the physical resources 1206-4 (e.g., one box) to the given region 1202-1 to ensure that the given region 1202-1 has 25% of the physical resources 1206. Such an example further illustrates that the workflow server 102 may select notification devices (e.g., the radio 137-4 in the fourth physical region 1202-4) to which the alert is sent. Furthermore, in such examples, the instructions to recalibrate the distribution of the physical resources 1206 to the given region 1202-1 may be generated using numerical algorithms and/or one or more machine learning algorithms.

Alternatively, when the distribution tracking data 1104 indicates that a delivery condition has not been met, the workflow server 102 may generate an alert that may comprise instructions to distribute the physical resources 1206-1 already at the given region 1202-1 from one or more first locations (e.g., from a one or more warehouses) to one or more first locations (e.g., one or more given addresses). Such an alert may be provided to the radio 137-1 at the given region 1202-1.

Alternatively, when the distribution tracking data 1104 indicates that a time-for-delivery condition has not been met, the workflow server 102 may generate an alert that may comprise instructions to distribute the physical resources 1206-1 faster, and may be provided to the radio 137-1 at the given region 1202-1.

Hence, an alert generated at the second responsive action 1320 may be to balance distribution of the physical resources 1206 between the regions 1202, and/or to cause more effective and/or more timely distribution of the physical resources 1206 within the given region 1202-1, to obviate the suboptimal-distribution condition.

Alternatively, and/or in addition, the alert may include the electronic map generated at the first responsive action 1314, which may be selected for inclusion via the "Define Alert" selectable option. As such an electronic map may include locations of the physical resources 1206, and locations of the personnel (and/or vehicles) distributing the physical resources 1206, such an electronic map may assist personnel receiving such an electronic map to redistribute and/or more effectively distribute the physical resources 106.

Alternatively, and/or in addition, the alert may comprise contact information for contacts associated with notification devices to which the alert was provided including, but not limited to, phone numbers of contacts, talkgroup affiliations of associated radios 137, 153 and the like, and/or any suitable contact information that may enable operators of the notification devices to call and/or communicate with each other to cooperate to redistribute and/or more effectively distribute the physical resources 106.

As depicted, the second workflow 1303-2 further comprises the third responsive action 1322 (e.g., third relative to the first responsive action 1314 and the second responsive action 1320), implemented in response to a positive result at the analysis component 1318. The third responsive action 1322 comprises: providing a notification, that the analysis component 1318 determined that the predetermined exemption condition has been met, to one or more notification devices.

As depicted, the third responsive action 1322 includes an electronic button 1332 (e.g., labelled "Contacts"). In particular, a menu 1334 associated with the electronic button 1332 may be provided at the display screen 705 when the electronic button 1332 is selected. As depicted, the menu 1334 includes a selectable option of "Select Contacts", which, when selected, may cause a pop-up box to be provided at the display screen 705 which may include a contact list, which may enable an operator to select notification devices (e.g., one or more of the radios 137, 153, one or more of the communication/notification devices 1204, and/or the workstation 101) to which the notification of the third responsive action 1322 is to be sent. For example, the notification may be sent to radios 137 in all regions 1202 and/or any suitable subset of the regions 1202, and the contact list may enable an operator to select such radios 137.

However, the contact list may further enable an operator to select one or more of the communication/notification devices 1204 (e.g., associated with third party service entities and/or watchdog groups), and/or the workstation 101.

It is further understood that one or more contacts and/or notification devices may be preselected (e.g., by the workflow server 102) as one or more default contacts and/or notification devices (e.g., using numerical based algorithms and/or machine learning algorithms). For example, radios 137 in all regions 1202 and all the communication/notification devices 1204 and/or the workstation 101 preselected as default contacts. In these examples, the selectable option of "Select Contacts" may enable an operator to update and/or change and/or confirm such default contacts.

The notification that is provided may alternatively comprise the aforementioned electronic map, contact information of suitable contacts, and the like.

Figure 14:
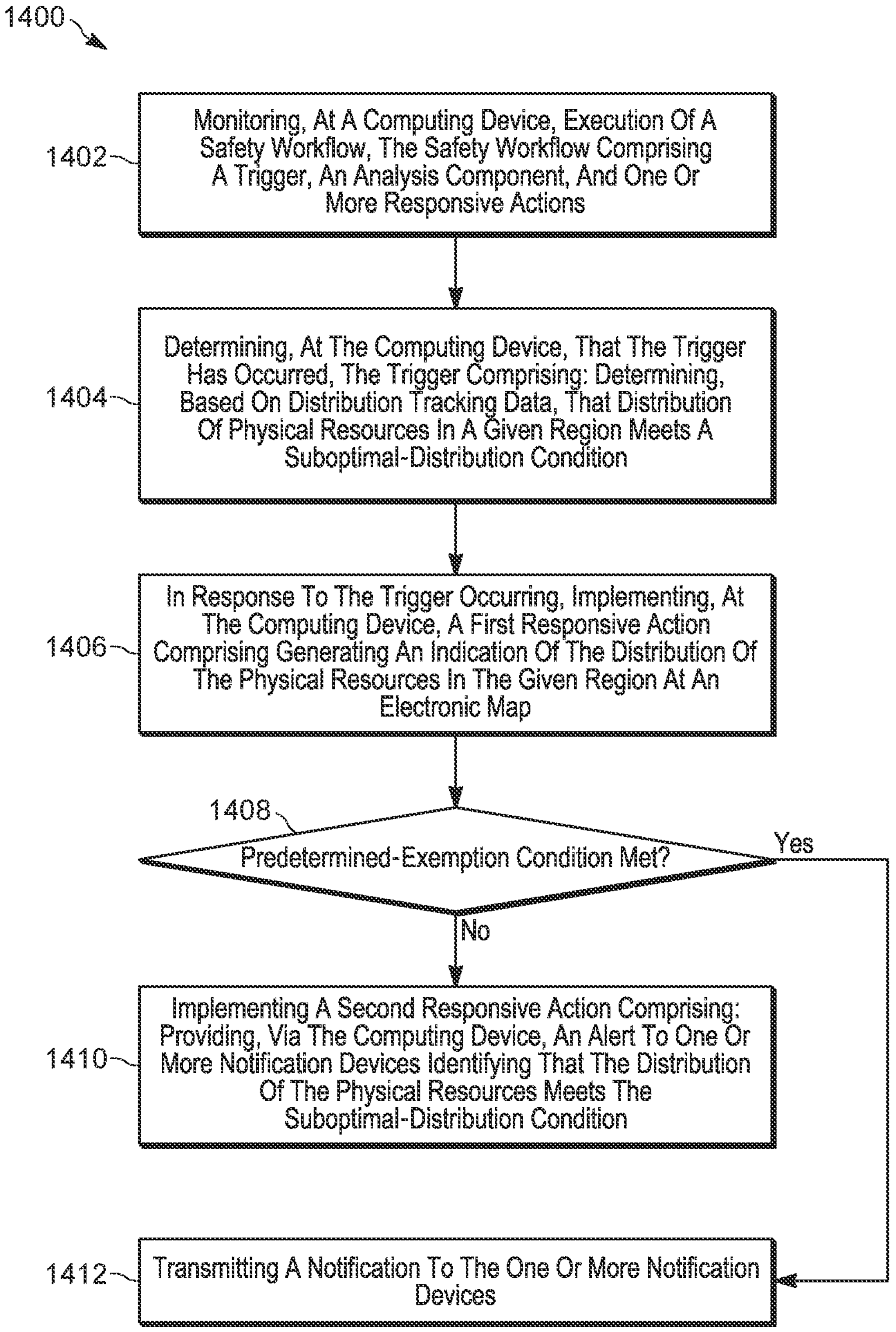
FIG. 14 depicts a flowchart of a method for distributing physical resources based on workflow interactions, in accordance with some examples.

Attention is now directed to FIG. 14, which depicts a flowchart representative of a method 1400 for distributing physical resources based on workflow interactions. the operations of the method 1400 of FIG. 14 correspond to machine readable instructions that are executed by the workflow server 102, and specifically the processor 603. In the illustrated example, the instructions are represented by the blocks of FIG. 14 and may be stored at the storage component 602. The method 1400 of FIG. 14 is one way that the processor 603 and/or the workflow server 102 and/or the system 100 may be configured. Furthermore, the following discussion of the method 1400 of FIG. 14 will lead to a further understanding of the system 100, and its various components.

The method 1400 of FIG. 14 need not be performed in the exact sequence as shown and likewise various blocks may be performed in parallel rather than in sequence. Accordingly, the elements of method 1400 are referred to herein as "blocks" rather than "steps." The method 1400 of FIG. 14 may be implemented on variations of the system 100 of FIG. 1, as well.

At a block 1402, the processor 603 and/or the workflow server 102 (and/or any other suitable computing device) monitors execution of the safety workflow 1303-2, the safety workflow 1303-2 comprising a trigger 1308, an analysis component (e.g., represented by the analysis components 1316, 1318), and one or more responsive actions 1314, 1320, 1322, as described above. In particular, the safety workflow 1303-2 may be enabled in response to a request for the physical resources 1206 to be distributed to address a public safety incident associated with the given region 1202-1, which may be embodied by the trigger 1304 of the safety workflow 1303-1.

At a block 1404, the processor 603 and/or the workflow server 102 (and/or any other suitable computing device) determines that the trigger 1308 has occurred, the trigger 1308 comprising: determining, based on the distribution tracking data 1104 (e.g. received via the network interface 601), that distribution of the physical resources 1206 in a given region, such as the given region 1202-1, meets a suboptimal-distribution condition.

As has been previously described, the suboptimal-distribution condition may comprise one or more of: a relative-distribution condition based on the distribution of the physical resources 1206 in the given region 1202-1 compared to respective distribution of the physical resources 1206 in the one or more other regions 1202 that are one or more of adjacent the given region 1202-1 and within a given distance from the given region 1202-1; a delivery condition based on delivery locations of the physical resources 1206 in the given region 1202-1 compared to respective delivery locations of the physical resources 1206 in the one or more other regions 1202; a time-for-delivery condition based on times to deliver the physical resources 1206 in the given region 1202-1 compared to respective times to deliver the physical resources 1206 in the one or more other regions 1202; and/or any other suitable suboptimal-distribution condition.

It is furthermore understood that the suboptimal-distribution condition may be user configurable, for example via the menu 1312.

At a block 1406, the processor 603 and/or the workflow server 102 (and/or any other suitable computing device), in response to the trigger 1308 occurring, implements, the first responsive action 1314 comprising generating an indication of the distribution of the physical resources 1206 in the given region 1202-1 at an electronic map. In some examples, the electronic map may be rendered at the display screen 705.

At a block 1408, the processor 603 and/or the workflow server 102 (and/or any other suitable computing device) implements the analysis component (e.g., represented by the analysis components 1316, 1318) comprising: determining whether the distribution of the physical resources 1206 meeting the suboptimal-distribution condition meets a predetermined exemption condition.

As has been previously described, the predetermined exemption condition may comprise one or more of: a severity-exemption condition based on determining that respective distribution of the physical resources 1206 to one or more other regions 1202-1, that are one or more of adjacent the given region 1202-1, or within a given distance from the given region 1202, is higher due to relative higher severity of a public safety incident that lead to the distribution of the physical resources 1206 meeting the suboptimal-distribution condition; an historical-data-exemption condition based on historical data indicating that historical public safety incidents, similar to the public safety incident, have a relative higher severity in the one or more other regions 1202 than the given region 1202-1; and/or any other suitable predetermined exemption condition.

It is furthermore understood that the predetermined exemption condition may be user configurable, for example via the menu 1326.

In response to the analysis component determining that the predetermined exemption condition has not been met (e.g., a "NO" decision at the block 1408, and/or the analysis component 1316 having a positive result), at a block 1410, the processor 603 and/or the workflow server 102 (and/or any other suitable computing device) implements the second responsive action 1320 comprising: providing an alert (e.g. via the network interface 601) to one or more notification devices identifying that the distribution of the physical resources 1206 meets the suboptimal-distribution condition.

As has been previously described, the alert may comprise instructions to recalibrate the distribution of the physical resources 1206 to the given region 1202-1 and/or the electronic map generated at the block 1406.

Furthermore, as has been previously described, the one or more notification devices to which the alert is provided may comprise one or more of: communication devices (e.g., the radios 137, 153) operated by one or more of personnel distributing the physical resources 1206; terminals of a public safety answering point (PSAP) overseeing distributing of the physical resources 1206 (e.g., such as the workstation 101); third party notification devices (e.g., one or more of the communication/notification devices 1204); watchdog group notification devices (e.g., one or more of the communication/notification devices 1204); and/or any other suitable notification device.

However, in response to the analysis component determining that the predetermined exemption condition has been met (e.g., a "YES" decision at the block 1408, and/or the analysis component 1318 having a positive result), at a block 1412, the processor 603 and/or the workflow server 102 (and/or any other suitable computing device) implements the third responsive action 1322 comprising: provide a notification that the predetermined exemption condition has been met to the one or more notification devices.

As has been previously described, the method 1400 may further comprise the processor 603 and/or the workflow server 102 (and/or any other suitable computing device) implementing one or more machine learning algorithms trained to implement one or more of the trigger 1308, the analysis component (e.g., the analysis components 1316, 1318), and/or any other suitable aspect of the method 1400.

For example, the method 1400 may include the processor 603 and/or the workflow server 102 (and/or any other suitable computing device): determining whether the suboptimal-distribution condition and/or the predetermined exemption condition are met or not met using one or more machine-learning algorithms; and implementing a machine-learning feedback loop for training the one or more machine-learning algorithms, the machine-learning feedback loop comprising processing feedback indicative of an evaluation of the suboptimal-distribution condition and/or the predetermined exemption condition being met or not met as determined by the one or more machine-learning algorithms. Hereafter, for clarity, reference will be made to "conditions" to indicate one or more of the suboptimal-distribution condition and/or the predetermined exemption condition.

For example, indications of the conditions being met or not met may be provided to one or more machine-learning algorithms (e.g., which may be components of the application 222) in a machine-learning feedback loop as training data and/or labelled training data. In particular, indications of the conditions being met or not met may be provided as a training set of a feedback loop for training the one or more machine-learning algorithms to better determine whether the conditions are met or not met. Such a training set may further include factors that lead to such determinations, including, but not limited to, the distribution tracking data 1104. Such a training set may be used to initially train the one or more machine learning algorithms.

Further, one or more later determinations of the conditions being met or not met may be labelled to indicate whether the later determinations of the conditions being met or not met, as generated by the one or more machine-learning algorithms, represent positive (e.g., effective) examples or negative (e.g., ineffective) examples.

For example, the one or more machine-learning algorithms, when later determining whether the conditions are met or not met, may also generate an associated respective probability score, for example on a scale of 0 to 100, with higher scores indicating a higher level of respective confidence in predicting whether the conditions were met or not met; hence, indications of the conditions being met or not met may be labelled with the scores in feedback to the one or more machine-learning algorithms. Put another way, such labels may comprise respective scores of the one or more machine learning algorithms determining whether the conditions were met or not met. In one example, however, such scores may be binary with, for example, a score of "0" indicating a negative example and a score of "1" indicating a positive example. In yet further examples, only positive examples of sets of determinations of the conditions being met or not met may be provided to the one or machine-learning algorithms in a machine-learning feedback loop (e.g., which may or may not be labeled as a binary score of "1" may be understood to be inherent in such examples), for example along with the distribution tracking data 1104 that lead to the determinations. However, any suitable scoring schemes are within the scope of the present specification.

Regardless, when indications of the conditions being met or not met are provided to one or more machine-learning algorithms in the machine-learning feedback loop, the one or more machine-learning algorithms may be better trained to determine whether the conditions are met or not met on the basis of the labels and/or the scores.

In some examples, at least a portion of feedback to one or more machine learning algorithms may be generated at the radios 137, 153 and/or one or more of the notification devices 1204 and/or the workstation 101 (e.g., as operated by respective users). For example, one or more users may review the determinations of the conditions being met or not met at a respective device, and manually enter an associated score example to label indications of the conditions being met or not met with the score. Such feedback may be provided to the workflow server 102 by a respective device for use by a machine-learning feedback loop. However, such scoring using manual input may be implemented at any suitable computing device of the system 100, for example via a computer terminal and/or laptop operated by one or more administrators, and the like.

Figure 15:
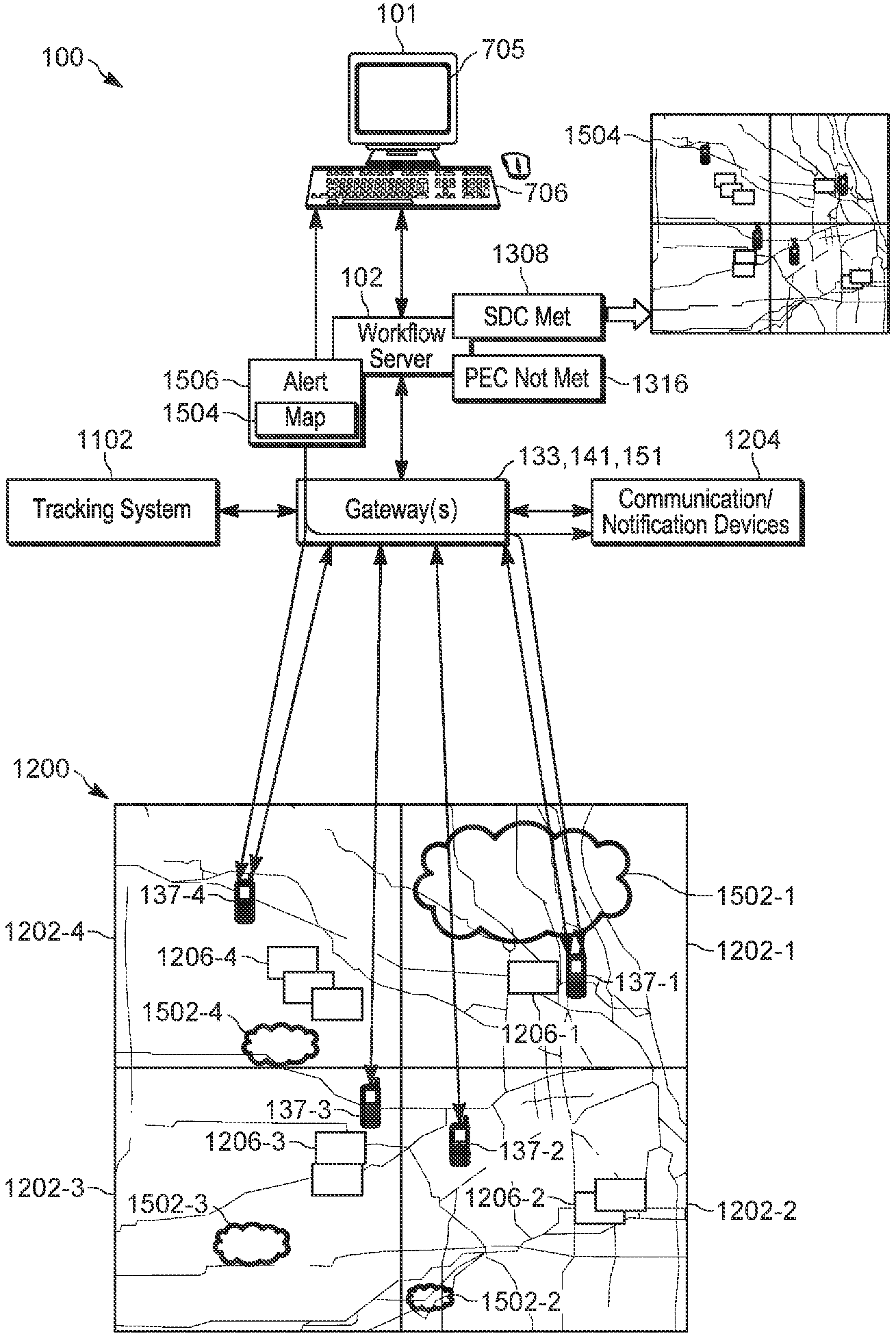
FIG. 15 depicts the system as shown in FIG. 15 at least partially implementing aspects of a method for distributing physical resources based on workflow interactions, in accordance with some examples.
Figure 16:
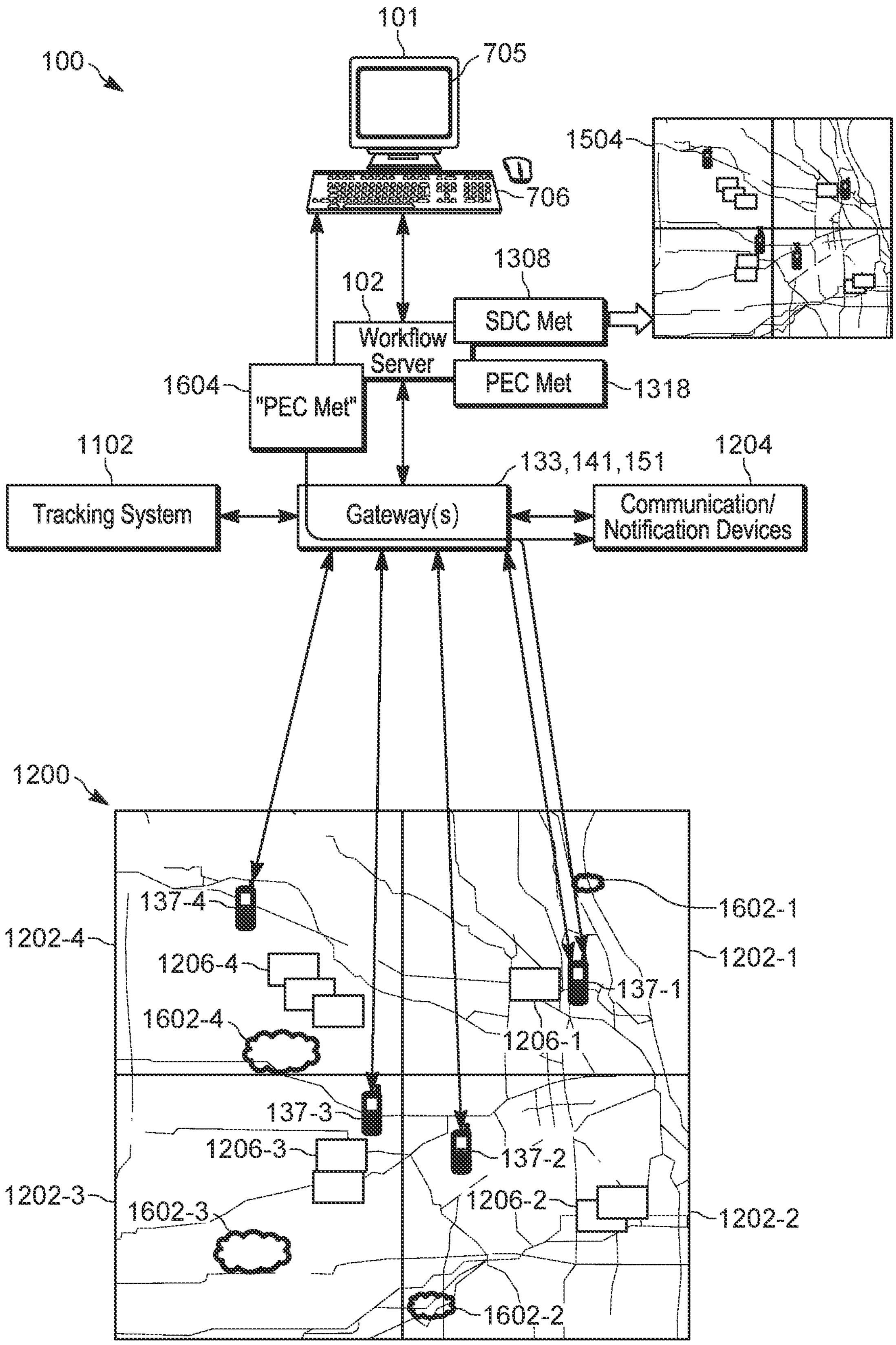
FIG. 16 depicts the system as shown in FIG. 15 at least partially implementing other aspects of a method for distributing physical resources based on workflow interactions, in accordance with some examples.

Attention is next directed to FIGS. 15 and 16 which depict examples of the method 1400. FIG. 15 and FIG. 16 are substantially similar to FIG. 12, with like components having like numbers.

In particular, the method 1400 will be first described with respect to FIG. 15 which depicts a public safety incident of a flood, which is represented by respective flood waters 1502-1, 1502-2, 1502-3, 1502-4 (e.g., flood waters 1502 and/or flood water 1502) at respective regions 1202. As depicted, it is understood that flood waters 1502-1 in the given region 1202-1 are more severe (e.g., over a larger area, and/or higher and/or affecting a larger number of people) as compared to respective flood waters 1502 in the other regions 1202, and that fewer respective physical resources 1206-1 have been distributed to the given region 1202-1 than the other regions 1202.

In FIG. 15, it is assumed that the workflow server 102 is implementing and/or monitoring the safety workflows 1303 (e.g., at the block 1402 of the method 1400).

In particular, as fewer physical resources 1206 have been distributed to the given region 1202-1, as compared to the other regions 1202, the workflow server 102 determines (e.g., at the block 1404 of the method 1400), via implementing the trigger 1308, that a suboptimal-distribution condition is met; for example, as depicted the trigger 1308 includes the suboptimal-distribution condition being met as indicated by "SDC MET", where "SDC" indicates "suboptimal-distribution condition".

As such, the workflow server 102 generates (e.g., at the block 1406 of the method 1400) an indication of the distribution of the physical resources 1206 in the given region 1202-1 at an electronic map 1504 of the geographic area 1200. For illustrative purposes, the electronic map 1504 is depicted external to the workflow server 102, though it is understood the electronic map 1504 may be generated internal to the workflow server 102, and/or at the display screen 705.

The electronic map 1504, as depicted, includes indications, in the form of boxes, of locations of the physical resources 1206 in the given region 1202-1, as well the other regions 1202, and locations of personnel distributing the physical resources 1206, for example in the form of icons indicating locations of respective radios 137.

As the flood water 1502-1 in the given region 1202-1 is more severe as compared to respective flood waters 1502 in the other regions 1202, the workflow server 102 determines (e.g., at the block 1408 of the method 1400), via implementing the analysis component 1316, that a predetermined exemption condition is not met; for example, as depicted the analysis component 1316 includes the predetermined exemption condition is not being met as indicated by "PEC NOT MET", where "PEC" indicates "predetermined exemption condition".

As such, the workflow server 102 provides (e.g., at the block 1410 of the method 1400, an alert 1506, that includes the electronic map 1504 to the radios 137-1, 137-4 in the regions 1202-1, 1202-4, as well as the notification devices 1204 and the workstation 101, the alert 1506 identifying that the distribution of the physical resources 1206 meets the suboptimal-distribution condition. The alert 1506 may hence instruct the operators of the radios 137-1, 137-4 to communicate to redistribute a portion of the physical resources 1206-4 in the fourth region 1202-4 to the given region 1202-1 to obviate the suboptimal-distribution condition.

In contrast, in FIG. 16, a public safety incident of a flood is also depicted, which is represented by respective flood waters 1602-1, 1602-2, 1602-3, 1602-4 (e.g., flood waters 1602 and/or flood water 1602) at respective regions 1202. As depicted, it is understood that flood waters 1602-1 in the given region 1202-1 are not more severe (e.g., over a smaller area, and/or lower and/or affecting a smaller number of people) as compared to respective flood waters 1602 in the other regions 1202, and that fewer respective physical resources 1206-1 have been distributed to the given region 1202-1 than the other regions 1202.

As such, the workflow server 102 determines that the suboptimal-distribution condition is met (e.g., via the trigger 1308), and may, as depicted, generate the electronic map 1504.

However, in contrast to the example of FIG. 15, as the flood water 1602-1 in the given region 1202-1 is less severe as compared to respective flood waters 1602 in the other regions 1202, the workflow server 102 determines (e.g., at the block 1408 of the method 1400), via implementing the analysis component 1318, that a predetermined exemption condition is met; for example, as depicted the analysis component 1318 includes the predetermined exemption condition is not being met as indicated by "PEC MET", where "PEC" indicates "predetermined exemption condition".

As such, the workflow server 102 provides (e.g., at the block 1412 of the method 1400, a notification 1604 (that may optionally include the electronic map 1504) to the notification devices 1204 and the workstation 101 (and which may sent to all the radios 137), the notification 1604 indicating that a predetermined exemption condition has been met, for example by way of text "PEC MET".

Hence, the implementation of the method 1400 furthermore changes the operation of the workflow server 102, for example to enable the workflow server 102 to become more efficient at controlling distribution of physical resources.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, implement electronic workflows, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

monitoring, at a computing device, execution of a safety workflow, the safety workflow comprising a trigger, an analysis component, and one or more responsive actions;

determining, at the computing device, that the trigger has occurred, the trigger comprising: determining, based on distribution tracking data, that distribution of physical resources in a given region meets a suboptimal-distribution condition;

in response to the trigger occurring, implementing, at the computing device, a first responsive action comprising generating an indication of the distribution of the physical resources in the given region at an electronic map;

implementing the analysis component comprising: determining, at the computing device, whether the distribution of the physical resources meeting the suboptimal-distribution condition meets a predetermined exemption condition; and in response to the analysis component determining that the predetermined exemption condition has not been met, implementing a second responsive action comprising: providing, via the computing device, an alert to one or more notification devices identifying that the distribution of the physical resources meets the suboptimal-distribution condition.

2. The method of claim 1, wherein the suboptimal-distribution condition comprises one or more of:

a relative-distribution condition based on the distribution of the physical resources in the given region compared to respective distribution of the physical resources in one or more other regions that are one or more of adjacent the given region and within a given distance from the given region;

a delivery condition based on delivery locations of the physical resources in the given region compared to respective delivery locations of the physical resources in the one or more other regions; or a time-for-delivery condition based on times to deliver the physical resources in the given region compared to respective times to deliver the physical resources in the one or more other regions.

3. The method of claim 1, wherein the predetermined exemption condition comprises one or more of:

a severity-exemption condition based on determining that respective distribution of the physical resources to one or more other regions, that are one or more of adjacent the given region, or within a given distance from the given region, is higher due to relative higher severity of a public safety incident that lead to the distribution of the physical resources meeting the suboptimal-distribution condition; or an historical-data-exemption condition based on historical data indicating that historical public safety incidents, similar to the public safety incident, have a relative higher severity in the one or more other regions than the given region.

4. The method of claim 1, wherein the predetermined exemption condition is user configurable.

5. The method of claim 1, further comprising:

implementing, at the computing device, one or more machine learning algorithms trained to implement one or more of the trigger or the analysis component.

6. The method of claim 1, wherein the alert further comprises instructions to recalibrate the distribution of the physical resources to the given region.

7. The method of claim 1, wherein the one or more notification devices comprise one or more of:

communication devices operated by one or more of personnel distributing the physical resources;

terminals of a public safety answering point (PSAP) overseeing distributing of the physical resources;

third party notification devices; or watchdog group notification devices.

8. The method of claim 1, wherein the alert comprises the electronic map.

9. The method of claim 1, further comprising, in response to the analysis component determining that the predetermined exemption condition has been met, providing a notification that the predetermined exemption condition has been met to the one or more notification devices.

10. The method of claim 1, wherein the safety workflow is enabled in response to a request for the physical resources to be distributed to address a public safety incident associated with the given region.

11. A computing device comprising:

a network interface; and a processor configured to:

monitor execution of a safety workflow, the safety workflow comprising a trigger, an analysis component, and one or more responsive actions;

determine that the trigger has occurred, the trigger comprising:

determining, based on distribution tracking data, that distribution of physical resources in a given region meets a suboptimal-distribution condition;

in response to the trigger occurring, implement a first responsive action comprising generating an indication of the distribution of the physical resources in the given region at an electronic map;

implement the analysis component comprising: determining whether the distribution of the physical resources meeting the suboptimal-distribution condition meets a predetermined exemption condition; and in response to the analysis component determining that the predetermined exemption condition has not been met, implement a second responsive action comprising: providing an alert, via the network interface, to one or more notification devices identifying that the distribution of the physical resources meets the suboptimal-distribution condition.

12. The computing device of claim 11, wherein the suboptimal-distribution condition comprises one or more of:

a relative-distribution condition based on the distribution of the physical resources in the given region compared to respective distribution of the physical resources in one or more other regions that are one or more of adjacent the given region and within a given distance from the given region;

a delivery condition based on delivery locations of the physical resources in the given region compared to respective delivery locations of the physical resources in the one or more other regions; or a time-for-delivery condition based on times to deliver the physical resources in the given region compared to respective times to deliver the physical resources in the one or more other regions.

13. The computing device of claim 11, wherein the predetermined exemption condition comprises one or more of:

a severity-exemption condition based on determining that respective distribution of the physical resources to one or more other regions, that are one or more of adjacent the given region, or within a given distance from the given region, is higher due to relative higher severity of a public safety incident that lead to the distribution of the physical resources meeting the suboptimal-distribution condition; or an historical-data-exemption condition based on historical data indicating that historical public safety incidents, similar to the public safety incident, have a relative higher severity in the one or more other regions than the given region.

14. The computing device of claim 11, wherein the predetermined exemption condition is user configurable.

15. The computing device of claim 11, wherein the processor is further configured to:

implement one or more machine learning algorithms trained to implement one or more of the trigger or the analysis component.

16. The computing device of claim 11, wherein the alert further comprises instructions to recalibrate the distribution of the physical resources to the given region.

17. The computing device of claim 11, wherein the one or more notification devices comprise one or more of:

communication devices operated by one or more of personnel distributing the physical resources;

terminals of a public safety answering point (PSAP) overseeing distributing of the physical resources;
third party notification devices; or
watchdog group notification devices.

18. The computing device of claim 11, wherein the alert comprises the electronic map.

19. The computing device of claim 11, wherein the processor is further configured to, in response to the analysis component determining that the predetermined exemption condition has been met, provide a notification that the predetermined exemption condition has been met to the one or more notification devices.

20. The computing device of claim 11, wherein the safety workflow is enabled in response to a request for the physical resources to be distributed to address a public safety incident associated with the given region.

* * * * *